US012453481B2

(12) United States Patent
D'Mello et al.

(10) Patent No.: US 12,453,481 B2
(45) Date of Patent: Oct. 28, 2025

(54) METHOD AND APPARATUS FOR DERIVING BIOMETRIC INFORMATION USING MULTIPLE-AXIS SEISMOCARDIOGRAPHY

(71) Applicant: MACDONALD, DETTWILER AND ASSOCIATES INC., Toronto (CA)

(72) Inventors: Yannick D'Mello, Mississauga (CA); Philip J.r. Roche, Montreal (CA); Michel A. Lortie, Saint-Lazare (CA)

(73) Assignee: MACDONALD, DETTWILER AND ASSOCIATES INC., Toronto (CA)

( * ) Notice: Subject to any disclaimer, the term of this patent is extended or adjusted under 35 U.S.C. 154(b) by 1097 days.

(21) Appl. No.: 17/269,777

(22) PCT Filed: Aug. 20, 2018

(86) PCT No.: PCT/CA2018/051006
§ 371 (c)(1),
(2) Date: Feb. 19, 2021

(87) PCT Pub. No.: WO2020/037391
PCT Pub. Date: Feb. 27, 2020

(65) Prior Publication Data
US 2021/0315463 A1 Oct. 14, 2021

(51) Int. Cl.
*A61B 5/0205* (2006.01)
*A61B 5/00* (2006.01)
(Continued)

(52) U.S. Cl.
CPC ........ *A61B 5/0205* (2013.01); *A61B 5/02405* (2013.01); *A61B 5/02438* (2013.01);
(Continued)

(58) Field of Classification Search
CPC .............. A61B 5/0205; A61B 5/02405; A61B 5/02438; A61B 5/0816; A61B 5/091;
(Continued)

(56) References Cited

U.S. PATENT DOCUMENTS

2002/0035337 A1* 3/2002 Oka ..................... A61B 5/0295
600/528
2002/0170193 A1* 11/2002 Townsend ............ A61B 5/1116
33/512
(Continued)

FOREIGN PATENT DOCUMENTS

CA 2976602 A1 9/2016

OTHER PUBLICATIONS

A. Moncada-Torres, et al., "Activity classification based on inertial and barometric pressure sensors at different anatomical locations," IOP Publishing Institute of Physics and Engineering in Medicine, Physiol.Meas. 35 (2014) pp. 1245-1263.
(Continued)

*Primary Examiner* — Tammie K Marlen
(74) *Attorney, Agent, or Firm* — Harness, Dickey & Pierce, P.L.C.

(57) ABSTRACT

An instrument and method for non-invasively deriving at least one biometric datum of a living vertebrate. A sensor positioned against the vertebrate measures vibrations within its body. The sensor provides the samples to the instrument as at least one time-stamped stream that correspond to one or more linear and/or rotational acceleration measurement axes. The instrument organizes the samples into windowed streams, separates them into a first set of streams corresponding to physical events of the vertebrate associated with cardiovascular activity and a second set of streams corresponding to physical events of the vertebrate associated with respiration. A datum can be extracted from the first set by autocorrelating it with a time-delayed version thereof to identify at least one characteristic peak of the vertebrate's cardiac cycle. A datum can be extracted from the second set by determining a characteristic frequency of respiration of the vertebrate.

34 Claims, 12 Drawing Sheets

(51) Int. Cl.
   *A61B 5/024* (2006.01)
   *A61B 5/08* (2006.01)
   *A61B 5/091* (2006.01)
   *A61B 5/11* (2006.01)
   *A61B 5/113* (2006.01)
(52) U.S. Cl.
   CPC ............ *A61B 5/0816* (2013.01); *A61B 5/091* (2013.01); *A61B 5/1102* (2013.01); *A61B 5/113* (2013.01); *A61B 5/6823* (2013.01); *A61B 5/7214* (2013.01); *A61B 5/7257* (2013.01); *A61B 5/7278* (2013.01); *A61B 2562/0219* (2013.01)
(58) Field of Classification Search
   CPC ..... A61B 5/1102; A61B 5/113; A61B 5/6823; A61B 5/7214; A61B 5/7257; A61B 5/7278; A61B 2562/0219; A61B 5/7225; A61B 5/7207; A61B 5/7246; A61B 5/08
   See application file for complete search history.

(56) References Cited

U.S. PATENT DOCUMENTS

| | | | |
|---|---|---|---|
| 2006/0155175 A1* | 7/2006 | Ogino | A61B 5/02438 600/595 |
| 2008/0021336 A1* | 1/2008 | Dobak, III | A61B 5/1102 600/508 |
| 2009/0030292 A1* | 1/2009 | Bartnik | A61B 5/0205 600/301 |
| 2009/0209875 A1* | 8/2009 | Giorgis | A61N 1/3702 600/512 |
| 2009/0308393 A1* | 12/2009 | Luceros | A61M 16/127 128/204.22 |
| 2010/0249633 A1* | 9/2010 | Droitcour | A61B 5/7203 600/534 |
| 2010/0262031 A1* | 10/2010 | Fu | A61B 5/0803 600/529 |
| 2011/0021928 A1 | 1/2011 | Giovangrandi et al. | |
| 2011/0066041 A1* | 3/2011 | Pandia | A61B 5/725 600/484 |
| 2011/0066062 A1* | 3/2011 | Banet | A61B 5/1118 600/534 |
| 2013/0096840 A1* | 4/2013 | Osorio | A61B 5/0205 702/19 |
| 2015/0065894 A1* | 3/2015 | Airaksinen | A61B 5/7282 702/19 |
| 2015/0133806 A1* | 5/2015 | Airaksinen | G16H 50/20 600/513 |
| 2015/0342466 A1* | 12/2015 | Thakur | A61B 5/361 600/528 |
| 2016/0007935 A1* | 1/2016 | Hernandez | A61B 5/024 600/595 |
| 2016/0278708 A1* | 9/2016 | Vrazic | A61B 5/1114 |
| 2016/0360977 A1* | 12/2016 | Salehizadeh | A61B 5/7253 |
| 2017/0042471 A1* | 2/2017 | Meriheinä | A61B 5/7225 |
| 2018/0214030 A1 | 8/2018 | Migeotte et al. | |

OTHER PUBLICATIONS

International Search Report and Written Opinion of the International Searching Authority, issued in PCT/CA2018/051006, mailed May 9, 2019; ISA/CA.

European Examiner Report for Application No. 18930601.2 dated Sep. 4, 2024.

Supplementary European Search Report for Application No. 18930601.2 dated Feb. 24, 2022.

* cited by examiner

METHOD AND APPARATUS FOR DERIVING BIOMETRIC INFORMATION USING MULTIPLE-AXIS SEISMOCARDIOGRAPHY

CROSS-REFERENCE TO RELATED APPLICATIONS

This application is a 371 U.S. National Phase of International Application No. PCT/CA2018/051006, filed Aug. 20, 2018. The entire disclosure of the above application is incorporated herein by reference.

TECHNICAL FIELD

The present disclosure relates to non-invasive measurement of cardiac and respiratory activity (CRA) and in particular to a method and apparatus for deriving biometric information from a higher-order vertebrate using multiple-axis seismocardiography and/or gyrocardiography.

BACKGROUND

In higher-order vertebrates, the cardiovascular system is a closed organ system that permits the transport of, without limitation oxygen, carbon dioxide ($CO_2$), nutrients and waste to and from cells through the subject's body.

The cardiovascular system consists of two main parts, the heart and approximately 5 liters of blood, that is connected to major organs and tissues via a network of blood vessels.

Blood is an aqueous fluid comprising a plurality of cells and proteins that is capable of transporting nutrients and oxygen to tissues that use them and collects waste, such as but not exclusively without limitation, $CO_2$ and uric acid which is excreted via organs such as the lungs ($CO_2$) and kidneys (uric acid).

The blood vessels comprise arteries, capillaries and veins. Arteries convey blood from the heart to the body's organs and cells. Veins convey blood from the body's organs and cells back to the heart. Capillaries are microvessels that convey blood between the arteries and the veins and facilitate the exchange of oxygen, $CO_2$, nutrients and waste between the blood within the capillaries and interstitial fluid beyond them to permit their transport to and from the body's organs and cells. The cardiovascular system is considered to be a closed system because typically, blood never leaves the network of blood vessels. Rather, the oxygen and nutrients in the blood diffuse beyond the capillary walls into the surrounding interstitial fluid and on to the body's organs and cells and $CO_2$ and wastes diffuse from the interstitial fluid back into the blood circulating through the blood vessels.

The heart and the lungs and their biomechanical function are discussed in summary below.

Effectively, as may be seen from FIG. 1, the heart, shown generally at 100, is comprised of four chambers, two atriums 110, 120 and two ventricles 130, 140, comprising a notional four chamber pump divided into two portions, divided by sides. The four chambers 110, 120, 130, 140 are coupled by valves that dilate by expansion and close by contraction in response to electrical stimuli.

The heart pumps blood around the circulatory system in the body, pumping oxygenated blood to the body's organs and cells and deoxygenated blood to the lungs. The pumping action is derived from the rhythmic contraction and relaxation of the heart muscle.

The right side of the notional pump, comprising the right atrium 110 and the right ventricle 130, receives deoxygenated blood from the vena cava via the superior vena cava 111 and the inferior vena cava 112. The right atrium 110 fills and once filled the right tricuspid valve 113 opens to allow blood to flow into and to fill the right ventricle 130. Upon contraction of the right ventricle 130, blood is ejected through the pulmonary semilunar valve 114 into the pulmonary artery 150 toward the lungs (not shown) for oxygenation.

The left side of the notional pump, comprising the left atrium 120 and the left ventricle 140, receives oxygenated blood returning from the lungs via the pulmonary vein 160. The left atrium 120 fills and once filled the mitral valve 123 opens to allow blood to flow into and to fill the left ventricle 140. Upon contraction of the left ventricle 140, oxygenated blood is ejected through the aortic valve 141 into the aorta 170 and into the rest of the body.

Thus, the physical events that occur in the operation of the heart are characterized by vibration and/or displacement events in the chest cavity. Such vibrational events are familiar to most persons, as it is not unusual to feel one's heart beating stronger against one's chest wall when undergoing physical stress or a heightened emotional state. It will be appreciated that such vibrational events are present throughout (if substantially less discernible during less strenuous periods) and can be detected (although generally not measured to any significant degree of accuracy) with assistance of an audio measuring device such as a stethoscope or microphone.

The lungs receive deoxygenated blood from the heart and return oxygenated blood to the heart. The lungs operate by inhalation of oxygenated air, which through gaseous exchange (of oxygen and $CO_2$) through the mucous membranes of the lung's branches, introduces oxygen to the deoxygenated blood pumped into the lungs by the right ventricle 130. While oxygen is taken up or absorbed forming oxyhaemoglobin in red blood cells, $CO_2$, which is a byproduct of metabolic processes in the body, is simultaneously removed from the blood (forming the carbohaemoglobin) also through gaseous exchange and into the lungs, whereupon it can be removed by exhalation. The rate of inhalation and/or exhalation (breathing rate) may vary from subject to subject and in response to physical stress and other responses to the body's demand for oxygen.

Again, the physical events involved in pulmonary function are characterized by vibration and/or displacement events in the chest cavity. Inhalation involves a contraction of the diaphragm and other chest muscles that expands the chest cavity, with significant displacement around the upper chest and sternum. By contrast, exhalation involves a relaxation of such muscles, allowing the lungs to empty and commensurately reduce in size. Inhalation is followed by exhalation in a cyclical or rhythmic fashion.

There are a number of methods that have been established for delivering measurements related to CRA.

Electrocardiography (ECG/EKG) measures electrical activity of the heart, in particular the potential of the cardiac signal as initiated by the sinus node, and infers the physical displacement caused by the mechanical action of the physical events initiated thereby, including without limitation, the opening and closing of valves and the pumping of blood, into, through, and out of chambers and vessels in the heart 100. Thus, while ECG is the conventional mechanism for monitoring CRA, it does so by measuring the electrical activity that stimulates and controls the operation of these physical events such as the contractions of the muscle that are responsible for circulation, rather than the physical events themselves.

The electrical impulse that initiates at the sinus node (the sinoatrial node located at the upper portion of the right atrium 110) travels downwards via conduction paths that cause ventricular contraction in the lower chambers (ventricles 130, 140). The progression of such pulses is slowed at the atrioventricular node. The "bundle of His" is the conduit (analogous to a wire in the electrical realm) that transmits the electrical impulses downward from the atrioventricular node, through branches (Purkinje fibers) of the ventricles 130, 140, and ultimately distributed to both ventricles 130, 140 through neural bundles. The passage of the electrical signal made up of such pulses triggers each part of the notional heart pump to move blood through the heart in cyclical or rhythmic fashion.

Because ECG is by definition an inferential mechanism of measuring CRA, it is not well suited to measure cardiac mechanics, that is, muscle activity, especially in high-risk subjects or those with congenital heart defects.

Just as the physical cardiac processes are conventionally monitored by an indirect, inferential (and electrical) mechanism, the physical pulmonary processes are conventionally monitored by another indirect and inferential method. In this case, the mechanism is typically acoustic, using a stethoscope or other audio sensor to listen for breath sounds indicative of inhalation and exhalation. Again, the inferential nature of this mechanism renders it difficult to measure abnormal conditions.

Echocardiography uses standard two-dimensional, three-dimensional and Doppler ultrasound to create images of the heart. Echocardiography can help detect cardiomyopathies. While it is not invasive in that it does not involve breaking the skin or entering body cavities, the ultrasonic transducers, display elements and other equipment are typically expensive and bulky, with the result that such procedures are usually restricted to hospital or large outpatient facilities. In some examples, sonographic contrast agents, including, without limitation, microbubbles, are injected into the bloodstream so as increase a local signal in the blood vessels and thus illuminate features.

Photoplethysmography is a portable measure of oxygen saturation ($SpO_2$) in the blood, from which heart rate may be derived. However, this mechanism is sensitive to variations in ambient light and skin contact.

Ballistocardiography (BCG) measures full body micro-accelerations. However, this mechanism calls for the use of a weighing scale or bed, or other methods that measure large displacements.

Phonocardioagraphy measures heart sounds. However, this mechanism lacks the ability to pinpoint the timing corresponding to valvular movements.

Seismocardiography (SCG) comprises measurement at the surface of the chest of cyclical myocardial vibrations generated by cardiac activity, through acceleration at the sternum. The source of the vibrations thus directly relates to the state of the heart's mechanical function. The technique was initially discovered in the 1960s, though its use in clinical applications was only first initiated in the 1990s. Historically the technique has involved measurement of acceleration by a single axis accelerometer, which has by and large failed to deliver accurate CRA measurements. Nevertheless, ex post facto analysis has demonstrated that SCG data can be correlated with mechanical cardiac functions of the heart by comparison with echocardiography.

Finally, gyrocardiography (GCG) is a technique analogous to SCG, in which the vibrations at the surface of the chest are measured as gyrations and vibrocardiography (VCG), a technique that combines seismocardiography (acceleration) and gyrocardiography (rotational energy) to describe vibrations at the surface of the chest.

This background information is provided to reveal information believed by the applicant to be of possible relevance to the present invention. No admission is necessarily intended, nor should be construed, that any of the preceding information constitutes prior art against the present invention.

SUMMARY

It is an object of the present disclosure to obviate or mitigate at least one disadvantage of the prior art.

According to a first broad aspect of the present disclosure, there is disclosed a method of non-invasively deriving at least one biometric datum of a living vertebrate, comprising actions, at an instrument, of: receiving, from a sensor positioned against the vertebrate, time-domain samples of measurements, by the sensor, of vibrations within a body of the vertebrate, in at least one time-stamped stream that corresponds to at least one associated axis of measurement of at least one of linear and rotational acceleration; organizing the samples into at least one windowed stream, each windowed stream having an associated time period and comprising a stream of sample groups, each group having an associated monotonously changing time stamp index and comprising samples having a time stamp that lies within the time period that precedes a time represented by the index; separating the at least one windowed stream into a first set of streams corresponding to physical events associated with cardiovascular activity and a second set of streams corresponding to physical events of the vertebrate associated with respiration; and extracting the at least one datum from at least one of: the first set of streams by autocorrelating the first set of streams with a time-delayed version thereof to identify at least one characteristic peak of a cardiac cycle of the vertebrate.

In an embodiment, the at least one axis of measurement can be selected from a group consisting of three mutually orthogonal linear acceleration axes and three rotational axes about the three linear acceleration axes. In an embodiment, the sensor can be positioned substantially over a chest cavity of the vertebrate. In an embodiment, the sensor can be positioned proximate to a xiphoid process of a sternum of the vertebrate with at least one of the linear acceleration axes being oriented toward a right side of the vertebrate substantially along a sinistrodexter thereof. In an embodiment, the samples can be recorded at a frequency that exceeds an expected maximum frequency of the vibrations by at least a factor of 10. In an embodiment, the samples can be recorded at a frequency that is less than a maximum sampling frequency that can be processed in real-time.

In an embodiment, the associated time period can be at least one of 2 s, 4 s, 6 s, 8 s and 10 s.

In an embodiment, the action of separating can comprise an action of filtering the at least one windowed stream into the first and second sets of streams. In an embodiment, the action of filtering can comprise an action of applying at least one passband that has as a first extremity thereof, a separation frequency that distinguishes vibrations corresponding to physical events of the vertebrate associated with cardiovascular activity from vibrations corresponding to physical events of the vertebrate associated with respiration. In an embodiment, the passband can have as a second extremity thereof, a frequency that distinguishes vibrations corresponding to physical events of the vertebrate associated with at least one of cardiovascular activity and respiration from vibrations substantially unrelated thereto. In an embodiment, the action of filtering can comprise an action of performing at least one of a z-transformation and a fast Fourier transformation (FFT).

In an embodiment, the action of extracting can be applied to a selected one of the windowed streams of samples. In an embodiment, the selected one of the windowed streams of samples can have an associated time period that is substantially an integer multiple of a period of a cardiac cycle of the vertebrate. In an embodiment, the integer can be 2.

In an embodiment, the action of organizing can limit application of the action of autocorrelating to a time-limited stream of samples. In an embodiment, the action of organizing can be performed by a windowing subsystem.

In an embodiment, the method can further comprise an action of conditioning at least one of the first set of streams and the second set of streams. In an embodiment, the action of conditioning at least one of the first set of streams and the second set of streams can comprise projecting the at least one of the first set of streams and the second set of streams as a stream of magnitudes along a selected axis. In an embodiment, the selected axis can be one of the axes of measurement. In an embodiment, the selected axis can be a composite of the at least one axis of measurement. In an embodiment, the action of conditioning the first set of streams can comprise smoothing the stream of magnitudes. In an embodiment, the action of conditioning the first set of streams can comprise reducing the stream of magnitudes by a mean value of the magnitudes. In an embodiment, the action of conditioning can comprise squaring the reduced stream of magnitudes.

In an embodiment, the action of extracting can comprise an action of identifying consecutive peaks associated with opening of an aortic valve (AO) in successive cardiac cycles and deriving a heart rate (HR) from a time difference therebetween. In an embodiment, the action of identifying can comprise calculating a maximum positive acceleration followed by a maximum negative acceleration. In an embodiment, the action of extracting can comprise deriving a plurality of heart rates from successive peaks associated with opening of an aortic valve and deriving a heart rate variability (HRV) from a difference therein. In an embodiment, the action of extracting can comprise an action of determining a peak associated with closing of the aortic valve (AC) in a cardiac cycle for which a peak associated with opening thereof has been identified and deriving a left ventricle ejection time (LVET) from a time difference therebetween. In an embodiment, the action of determining comprises ignoring the identified peak associated with opening of the aortic valve and thereafter noting a maximum positive acceleration.

In an embodiment, the action of conditioning the second set of streams can comprise an action of selecting a single frequency from the second set of streams from at least one of a maximum frequency, a minimum frequency, a mean frequency and an intermediate frequency. In an embodiment, the action of extracting at least one datum can comprise using the selected frequency as a respiration rate (RR). In an embodiment, the action of conditioning the second set of streams can comprise an action of isolating a single cycle of the selected frequency. In an embodiment, the action of conditioning the second set of streams can comprise an action of fitting a sinusoidal function to the isolated single cycle of the selected frequency.

In an embodiment, the action of extracting at least one datum can comprise deriving a respiratory phase (RP) from a ration of a positive half-cycle of the single cycle of the sinusoidal function relative to a negative half-cycle thereof. In an embodiment, the action of extracting at least one datum can comprise deriving a respiratory volume (RV) from a difference between a maximum positive amplitude and a maximum negative amplitude of the single cycle of the sinusoidal function.

In an embodiment, the at least one datum can comprise a stream of instantaneous values thereof.

According to another broad aspect of the present disclosure, there is disclosed an instrument for non-invasively deriving at least one biometric datum of a living vertebrate, comprising: a windowing subsystem for: receiving, from a sensor positioned against the vertebrate, time-domain samples of measurements, by the sensor, of vibrations within a body of the vertebrate, in at least one time-stamped stream that corresponds to at least one associated axis of measurement of at least one of linear and rotational acceleration, and organizing the samples into at least one windowed stream, each windowed stream having an associated time period and comprising a stream of sample groups, each group having an associated monotonously changing time stamp index and comprising samples having a time stamp that lies within the time period that precedes a time represented by the index; a separation filter for separating the at least one windowed stream into a first set of streams corresponding to physical events of the vertebrate associated with cardiovascular activity and a second set of streams corresponding to physical events of the vertebrate associated with respiration; at least one of an autocorrelator and a frequency selector; the autocorrelator for convolving the first set of streams with a time-delayed version thereof, to identify at least one characteristic peak of a cardiac cycle of the vertebrate, and the frequency selector for determining a characteristic frequency of respiration of the vertebrate.

According to another broad aspect of the present disclosure, there is disclosed an instrument comprising: a processor; and a non-transitory memory for storing instructions that when executed by the processor cause the instrument to non-invasively derive at least one biometric datum of a living vertebrate, by: receiving, from a sensor positioned against the vertebrate, time-domain samples of measurements, by the sensor, of vibrations within a body of the vertebrate, in at least one time-stamped stream that corresponds to at least one associated axis of measurement of at least one of linear and rotational acceleration; organizing the samples into at least one windowed stream, each windowed stream having an associated time period and comprising a stream of sample groups, each group having an associated monotonously changing time stamp index and comprising samples having a time stamp that lies within the time period that precedes a time represented by the index; separating the at least one windowed stream into a first set of streams corresponding to physical events of the vertebrate associated with cardiovascular activity and a second set of streams corresponding to physical events of the vertebrate associated with respiration; and extracting the at least one datum from at least one of: the first set of streams by autocorrelating the first set of streams with a time-delayed version thereof to identify at least one characteristic peak of a cardiac cycle of the vertebrate, and the second set of streams by determining a characteristic frequency of respiration of the vertebrate.

Embodiments have been described above in conjunction with aspects of the present disclosure upon which they can be implemented. Those skilled in the relevant art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Some aspects and embodiments of the present disclosure may provide a method and apparatus for deriving CRA measurements using multiple-axis seismocardiography and/or gyrocardiography whether in combination or independently, one of the other, in order to enhance the accuracy of CRA.

BRIEF DESCRIPTION OF THE DRAWINGS

Example embodiments of the present disclosure will now be described by reference to the following figures, in which identical reference numerals in different figures indicate identical elements and in which.

Figure 1:
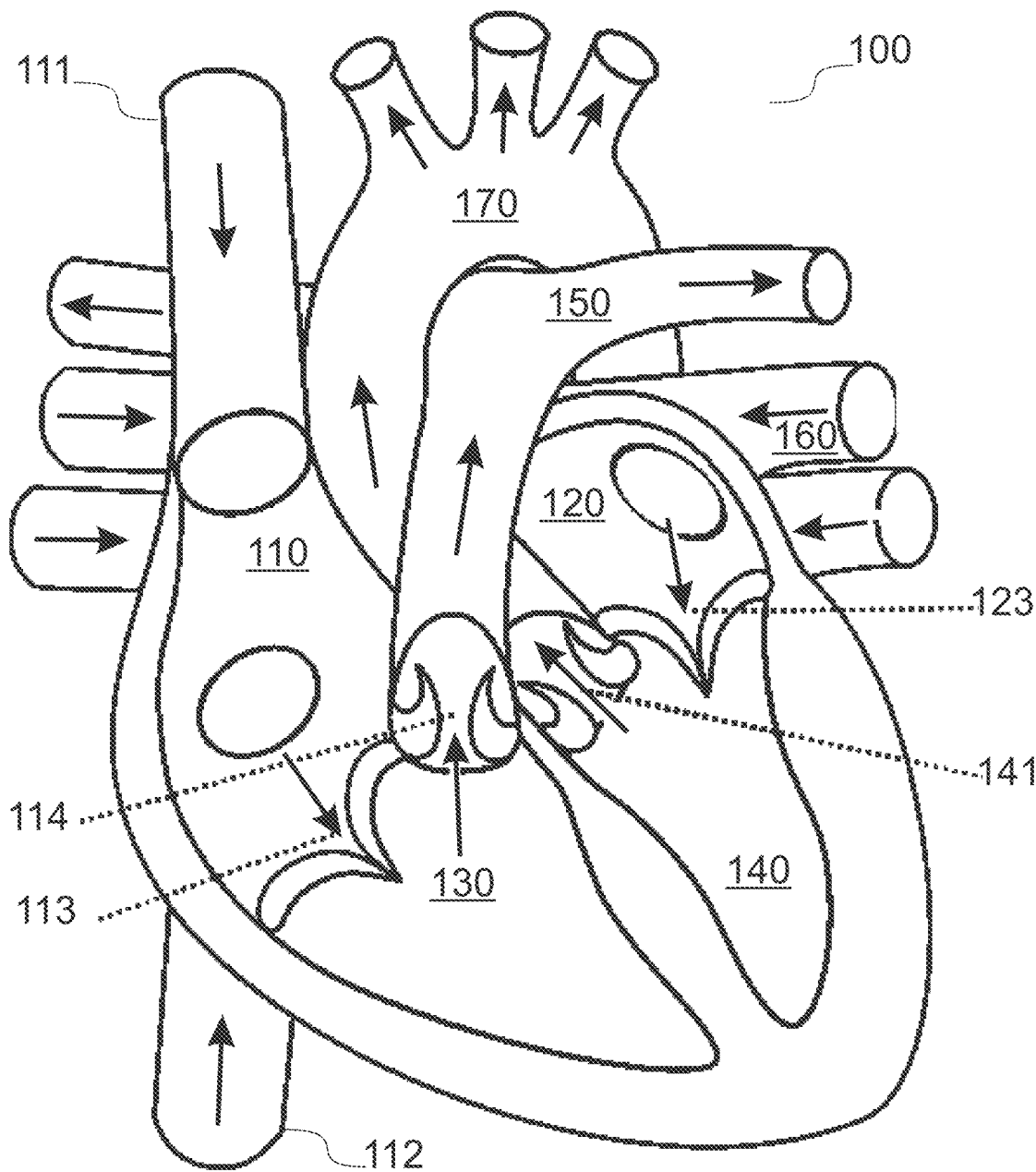
FIG. 1 is an example illustration of a cross-section of a heart of a higher-order vertebrate.

In the present disclosure, for purposes of explanation and not limitation, specific details are set forth in order to provide a thorough understanding of the present disclosure. In some instances, detailed descriptions of well-known devices and methods are omitted so as not to obscure the description of the present disclosure with unnecessary detail.

Accordingly, the system and method components have been represented, where appropriate, by conventional symbols in the drawings, showing only those specific details that are pertinent to understanding the embodiments of the present disclosure, so as not to obscure the disclosure with details that will be readily apparent to those of ordinary skill in the art having the benefit of the description herein.

Any feature or action shown in dashed outline may in some example embodiments be considered as optional.

DESCRIPTION

The present disclosure relates to a method and apparatus for deriving biometric CRA information using multiple-axis SCG and/or GCG. In this disclosure, both linear acceleration and rotational acceleration or gyration measurements are considered and disclosed. Those having ordinary skill in the relevant art will appreciate that known mathematical transformations allow gyration data about an axis in a three-dimensional space to be transformed into linear acceleration data about the same axis in the same space and vice versa.

Thus, for purposes of simplicity only, the present disclosure more frequently references the terms "acceleration", "accelerometer" and derivative forms thereof. Nevertheless, it should be understood that reference in the present disclosure to such terms is intended to encompass concepts of "gyration", "gyrometer" and derivative forms thereof and/or "rotation", "rotational acceleration", "rotational accelerometer" and derivative forms thereof, whether in addition to or in substitution for "acceleration", "accelerometer" and derivative forms thereof, and that the apparata and methodologies disclosed herein can be applied to the same data to derive similar, if not identical, results.

The Sensor

Figure 2:
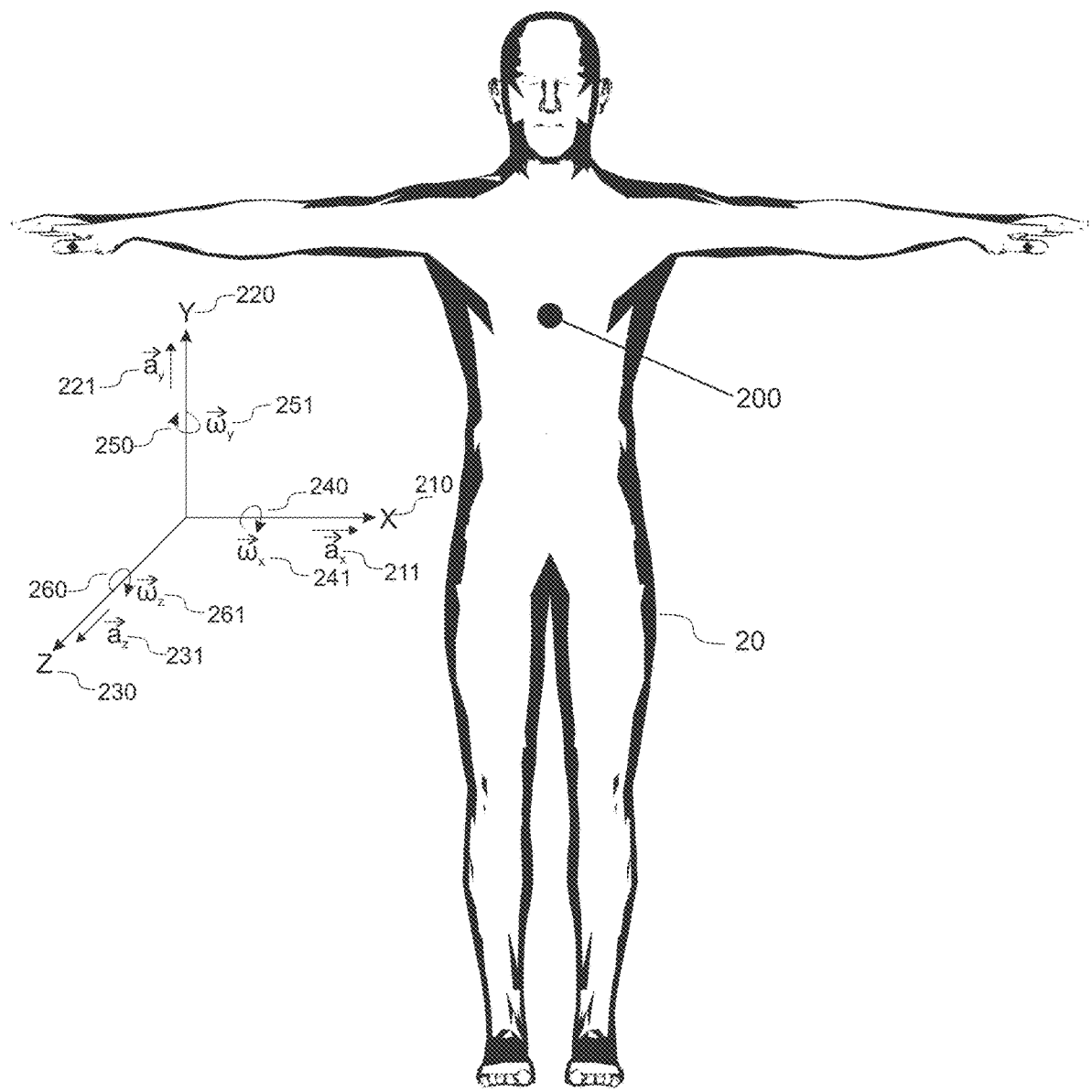
FIG. 2 is an example illustration showing the vertebrate subject of FIG. 1 and the position of a multiple-axis sensor against it and proximate to the chest cavity thereof.

Measurements from which the biometric CRA data may be derived may be obtained in a non-invasive fashion by positioning a multiple-axis sensor 200 against the body of a higher-order vertebrate subject 20, such as is shown in FIG. 2 in a position that permits the detection of the myocardial vibrations of the subject 20 by the sensor 200.

The data recorded by the sensor 200 represent vibrations that have their origins in biological processes that can be measured as accelerations.

In some examples, the sensor 200 comprises a 3-axis (degree of freedom) accelerometer that measures linear or rotational acceleration. For linear acceleration, designated a, the three axes are denoted as the X 210, Y 220 and Z 230 axes. In some examples, the Z axis 230 is directed substantially normally outwardly from the body of the subject 20. In some examples, the Y axis 220 is directed substantially from the sensor 200 toward the head of the subject 20 and the X axis 210 is directed substantially normally to both the Y 220 and Z 230 axes in a right-handed coordinate system. For rotational acceleration, designated w, the three axes 240, 250, 260 represent clockwise rotations about the positive X 210, Y 220 and Z 230 axes, when viewed from the origin, which in some examples is defined as the centre of the sensor 200, respectively.

Thus, the linear acceleration may be described by its component vectors $a_x$ 211, $a_y$ 221, $a_z$ 231 and the rotational acceleration may be described by its component vectors $w_x$ 241, $w_y$ 251, $w_z$ 261 respectively.

In some examples, the sensor 200 comprises a 6-axis device that measures both linear and rotational acceleration along each of three axes. In some examples, the sensor 200 comprises a 9-axis device that measure both linear and rotational acceleration along each of three axes, together with the magnetic field along three axes, which latter three axes are ignored.

In some examples, the sensor 200 may be positioned on the subject 20 on the xiphoid process of the sternum, with the accelerometer X 210, Y 220 and Z 230 axes oriented right along the sinistrodexter, upward along the inferior-superior, and outward along the dorsoventral axes respectively.

It will be appreciated that by virtue of the positioning of the sensor 200 on the subject 20 proximate to both the heart and the lungs, the sensor 200 may detect signals that have multiple origins relating to biological events within the chest cavity, in that they reflect physical events, each having a periodicity and predominant frequency bandwidth, of both the heart and the lungs in an intermingled fashion. Additionally, the sensor 200 may detect signals that are unrelated to either a physical event of the heart or a physical event of the lungs and as such may be considered to constitute extraneous noise. By way of non-limiting example, vibrations may be caused by bodily processes, such as talking, movement and/or microtremors may fall within the frequency range occupied by these physical events and may provide some slight correlation to one or more of the biometric data being derived herein and no correlation to other biometric data. To the extent that they are not relevant to a given biometric datum, in some examples they may be isolated therefrom by considering their different frequency and/or periodicity.

In some examples, the sensor 200 may comprise an InvenSense™ model MPU-9250 inertial measurement unit (IMU).

Given that the time period over which biophysical processes such as breathing and the opening and/or closing of a heart valve occur, include event occurrences that are measured in fractions of a second, the sensor 200 is sampled at a frequency selected to ensure that a large number of samples are taken for each event occurrence. Indeed, the spectrum of most physical events of significance to SCG has been speculated to exist only up until substantially 20 Hz. In some examples, the sensor 200 is sampled at a frequency of 250 Hz or substantially in excess of ten times the highest frequency of interst, with the acceleration set to its highest resolution of ±2 g, where 1 g=9.8 m/s$^2$. In some examples, the resulting stream of samples is downsampled to a frequency of 200 Hz, so as to reduce computational time to less than 1 second per second of measurement, allowing processing in real-time, while retaining any significant signal features up to 100 Hz, as determined by the Nyquist theorem.

In some examples, the downsampling can be achieved using an interpolation technique that accounts for any discretization errors that may be caused by inconsistent lags in data transfer between the sensor 200 and the system 300 discussed below, with reference to FIG. 3, which in some examples may be implemented on a microcontroller to which the sensor 200 is interfaced through a link such as an I2C link (not shown).

The samples are time stamped to indicate the time that has passed from the start of the activation of the sensor 200 until the time of signal acquisition. The time stamp accompanies the corresponding sample throughout the processing described herein. A subsequent sample in time takes reference from a previous sample in time.

The System

Figure 3:
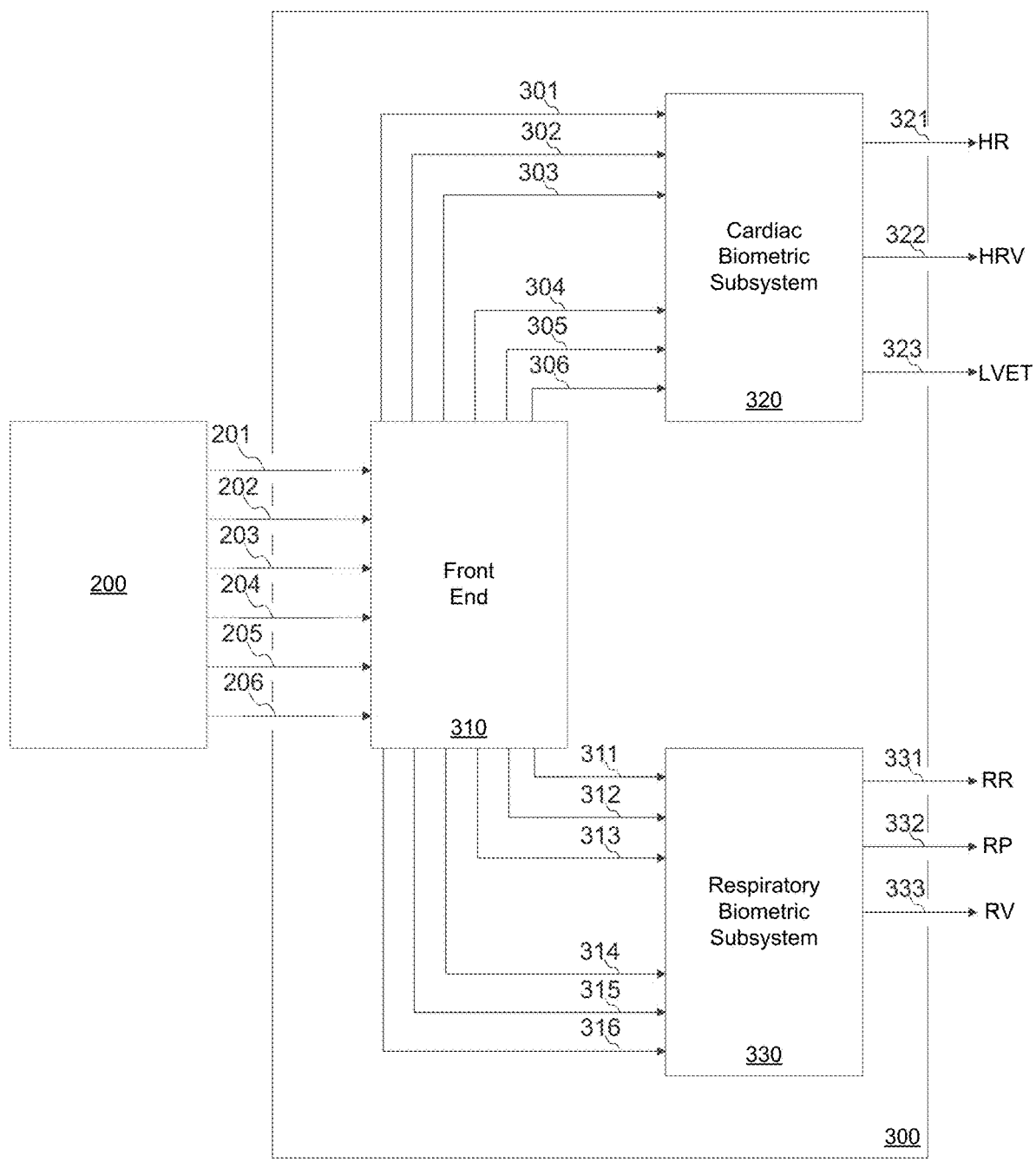
FIG. 3 is a simplified block diagram showing an example system for generating CRA biometric information from samples obtained from the sensor of FIG. 2 according to an example.

Turning now to FIG. 3, there is shown a simplified block diagram of an example system 300 for deriving biometric CRA data according to the present disclosure.

The system 300 accepts as input, a stream of samples 201-206 output by the sensor 200 from at least one axis 210, 220, 230, 240, 250, 260. Samples 201 correspond to linear acceleration along the X axis 210. Samples 202 correspond to linear acceleration along the Y axis 220. Samples 203 correspond to linear acceleration along the Z axis 230. Samples 204 correspond to rotational acceleration along the $w_x$ axis 240, that is, about the X axis 210 in a clockwise direction. Samples 205 correspond to rotational acceleration along the $w_y$ axis 250, which is about the Y axis 220 in a clockwise direction. Samples 206 correspond to rotational acceleration along the $w_z$ axis 260, which is about the Z axis 230 in a clockwise direction.

The system 300 supports as many as 6 axes of samples. However, in some examples, less than 6 axes may be supplied by the sensor 200 and processed by the system 300. In some examples, the at least one axis may all be a common type, such as, by way of non-limiting example, linear acceleration or rotational acceleration. It will be appreciated that combining information along a plurality of linear acceleration axes and/or combining information along a plurality of rotational acceleration axes may increase the accuracy of the CRA biometric information that may be derived by the system 300. In some examples, the plurality of axes may comprise, in combination, one or more than one linear acceleration axis and one or more than one rotational acceleration axis. It will appreciated that combining information along at least one linear acceleration axis with information along at least one rotational acceleration axis may increase the accuracy of the CRA biometric information that may be derived by the system 300. It will be appreciated that, while the 6 axes of samples 201-206 may contain redundant data, increasing the number of axes of samples 201-206 that are presented to the system 300 may increase the accuracy of the CRA biometric information that may be derived by the system 300.

The system 300 comprises three subsystems, namely a front end 310, a cardiac biometric subsystem 320 and a respiratory biometric subsystem 330.

The Front End

The front end 310 processes at least one axis of time-stamped samples 201-206 recorded by the sensor 200 and separates the signals corresponding to physical events of the heart from the signals corresponding to physical events of the lungs and to a lesser extent, discards any apparent noise signals. The front end 310 accepts as inputs, the at least one axis of time-stamped samples 201-206 and generates at least one windowed stream of axes of processed cardiac samples 301-306 and at least one windowed stream of axes of processed respiratory samples 311-316. The number of and axis of the processed cardiac samples 301-306 and of the processed respiratory samples 311-316, each correspond to the number of and axis of the samples 201-206 provided by the sensor 200.

The at least one windowed stream of axes of processed cardiac samples 301-306 is considered to represent the signals corresponding to physical events of the heart and are provided to the cardiac biometric subsystem 320. It will be appreciated that only those axes which are present in the at least one axis of samples 201-206 will have a corresponding axis output in the processed cardiac samples 301-306.

The at least one windowed stream of axes of processed respiratory samples 310-316 is considered to represent the signals corresponding to physical events of the lungs and are provided to the respiratory biometric subsystem 330. It will be appreciated that only those axes which are present in the at least one axis of samples 201-206 will have a corresponding axis output in the processed respiratory samples 311-316.

Figure 4:
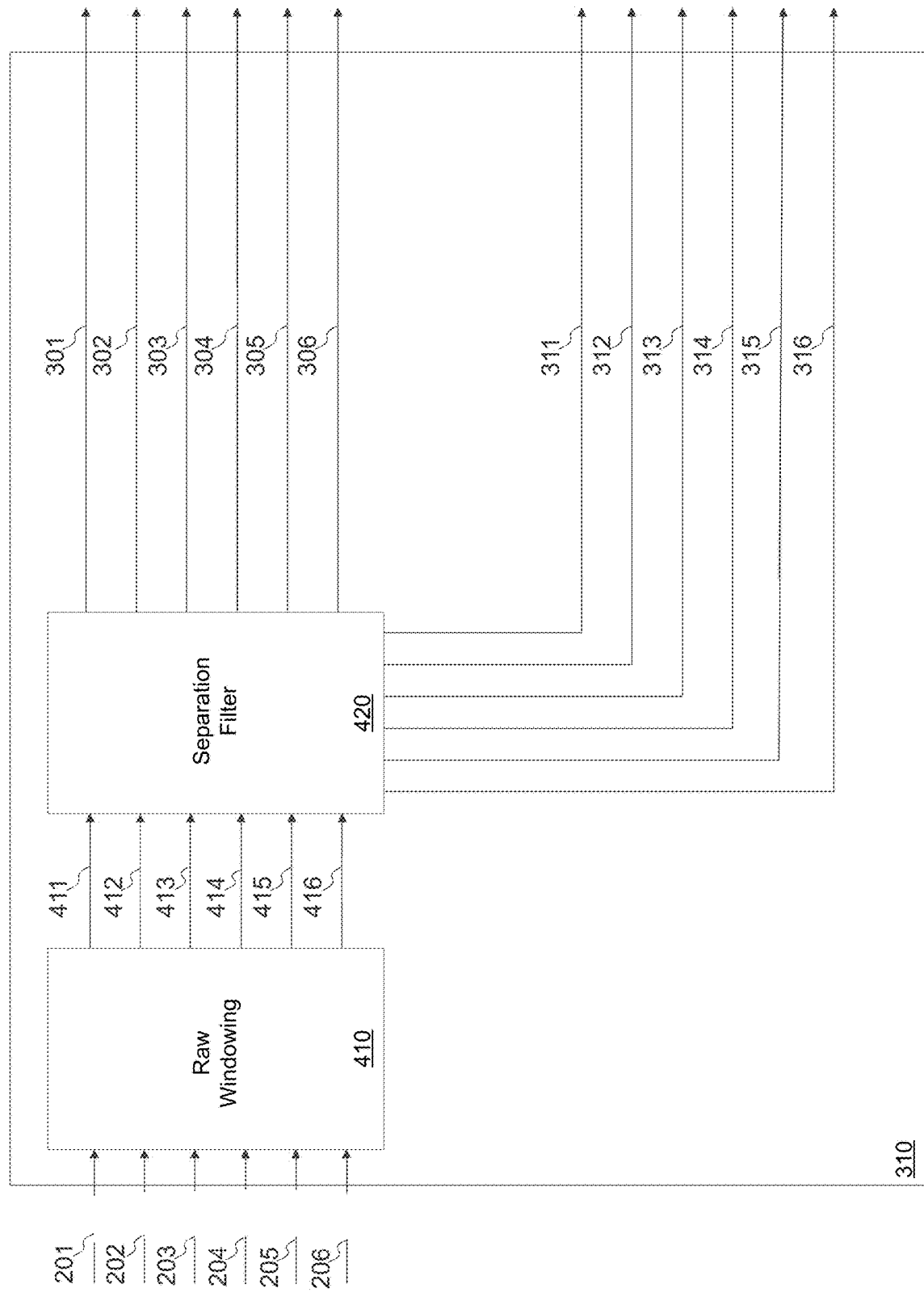
FIG. 4 is a simplified block diagram showing an example front end subsystem of the system of FIG. 3 according to an example.

An example of the front end 310 is shown in detail in FIG. 4. It comprises a windowing subsystem 410 and a separator filter 420.

The windowing subsystem 410 organizes or subdivides the at least one axis of time-stamped samples 201-206 into at least one windowed stream, each having an associated window or time period of varying duration. The windows are used to break up the stream in each of the axes of samples 201-206 into manageable segments for later processing. Each windowed stream comprises a stream of sample groups, where each sample group has an associated time stamp index. The windowed stream comprises sample groups having a monotonously changing (that is, increasing or decreasing) time stamp index. The samples within each sample group are those samples that have a time stamp that lies within the time period of the associated window preceding the time stamp index. The time period, or size of the windows used is proportional to signal complexity, in that the longer the window time period, the greater the number of samples that are processed as a unit.

Figure 5:
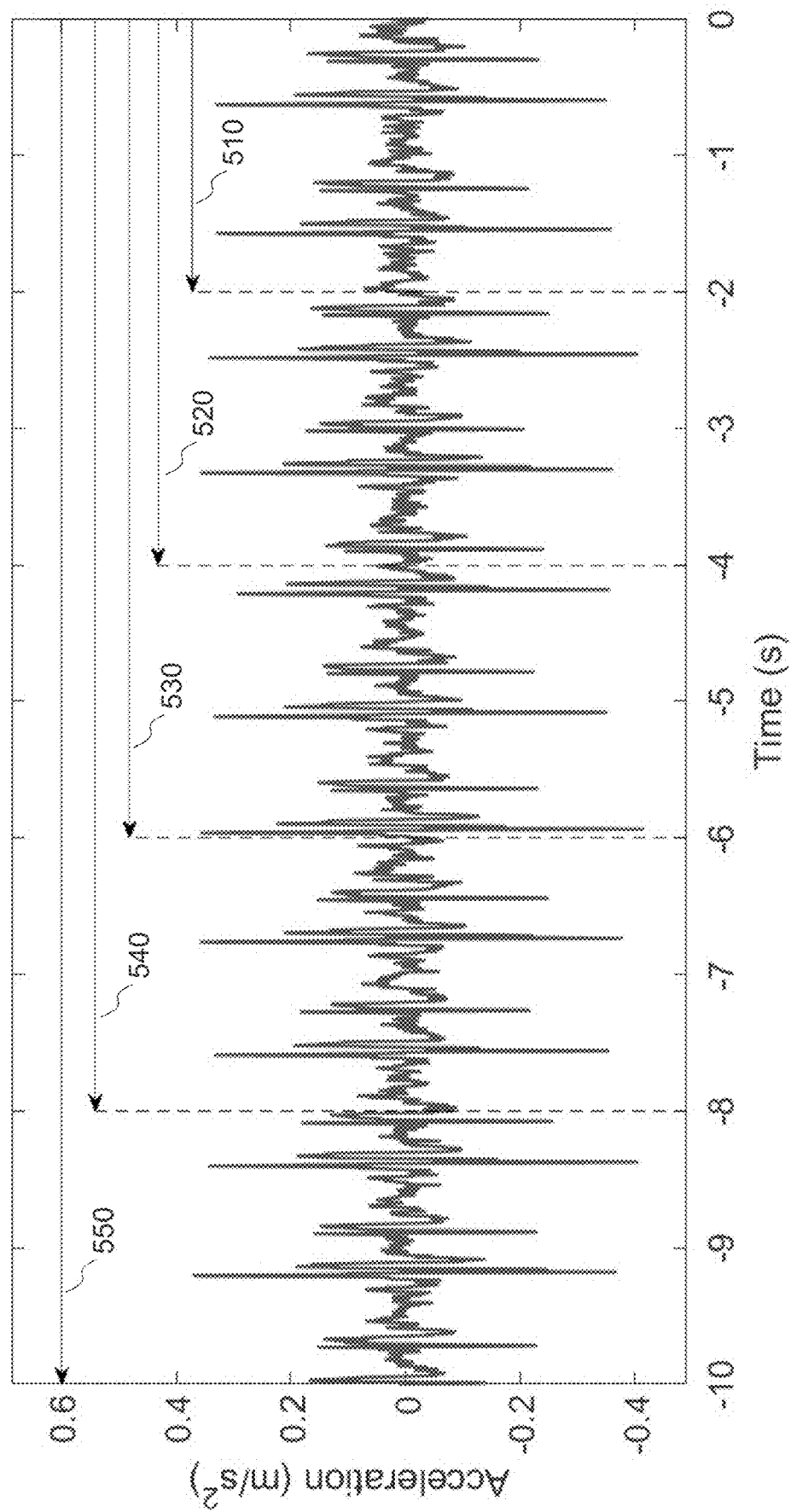
FIG. 5 is an example trace of a time domain signal showing a plurality of windows of different duration according to an example.

In some examples, a plurality of windows, each of different duration may be applied by the windowing subsystem 410. This is illustrated by way of non-limiting example in FIG. 5, in which five windows 510, 520, 530, 540, 550, each of respective durations of 2 s, 4 s, 6 s, 8 s and 10 s are shown in respect of a single sample stream.

Thus, each of the windows 510, 520, 530, 540, 550 extends from the time of the most current time sample 501 (that is a time stamp index of t=0) and back in time for their respective time period. The samples in the stream 500 whose time stamp precedes the time stamp index by less than the time period of each of the windows 510, 520, 530, 540, 550 are processed by the rest of the system 300. Those having ordinary skill in the relevant art will appreciate that the at least one window is applied to each of up to 6 sample streams based on their availability for processing.

Analysis is performed on samples within each windowed stream separately. At a later point in the processing, for each biometric datum being derived, a decision is made, based upon the results, which of the windowed streams to employ in deriving that particular datum.

It will be appreciated that, with different samples and different sensors 200 and/or different subjects 20, and indeed, different points in time, different windowed streams may be employed. Indeed, while the system 300 assumes that the periodicity of a cardiac cycle with respect to a measurement is constant within any given windowed stream, it will be appreciated that heart rate is not necessarily (and indeed is frequently not) constant. As such, a direct application of the windowing sub-system and processing within the cardiac biometric subsystem 320 and in particular, the VarWin function 725, is that the variability in heart rate may be observed and quantified over time.

Those having ordinary skill in the relevant art will appreciate that use of the windowing subsystem 410 helps to maintain the accuracy of the autocorrelator 735 (discussed below) over varying signal rates.

The separation filter 420 accepts as inputs the at least one windowed stream of axes of sample groups 411-416 and generates two different sets of windowed streams of corresponding axes of samples.

The first set of windowed streams correspond to physical events of the subject 20 associated with cardiovascular activity of the subject 20, and is denoted as a set of windowed streams of axes of processed cardiac samples 301-306. This first set of windowed streams of axes of processed cardiac samples 301-306 are output to the cardiac biometric subsystem 320.

The second set of windowed streams correspond to physical events of the subject 20 associated with respiration of the subject 20, and is denoted as a set of windowed streams of axes of processed respiratory samples 311-316. This second set of windowed streams of axes of processed respiratory samples 311-316 are output to the respiratory biometric subsystem 330.

In some examples, the separation filter 420 implements a pair of z-transformations that transform the time domain samples as two sets of windowed streams of axes of complex frequency-domain representation samples corresponding to respectively, the processed cardiac samples 301-306 and the processed respiratory samples 311-316.

In some examples, the separation filter 420 implements a fast Fourier transform (FFT) to transform the time domain samples into frequency domain samples and then filters the frequency domain samples to generate two sets of windowed streams of frequency domain samples corresponding to respectively, the processed cardiac samples 301-306 and the processed respiratory samples 311-316.

Those having ordinary skill in the relevant art will appreciate that the separation filter 420 may implement other types of filters, including without limitation, a forward impulse response (FIR) filter.

In some examples, the separation filter 420 may separate the time domain samples into the two sets of windowed streams based on frequency.

In some examples, the separation filter 420 separates the samples into the two sets of windowed streams according to a threshold separation frequency $f_s$, such that the first set of windowed streams of processed cardiac samples 301-306 correspond to those samples that exceed the separation frequency $f_s$ and the second set of windowed streams of processed respiratory samples 311-316 correspond to those samples that are less than the separation frequency $f_s$. In some examples, the separation frequency $f_s$ is set to a value that lies substantially above frequencies representative of the physical events of the lungs and their periodicity but lies substantially below frequencies representative of the physical events of the heart and its periodicity.

Figure 6A:
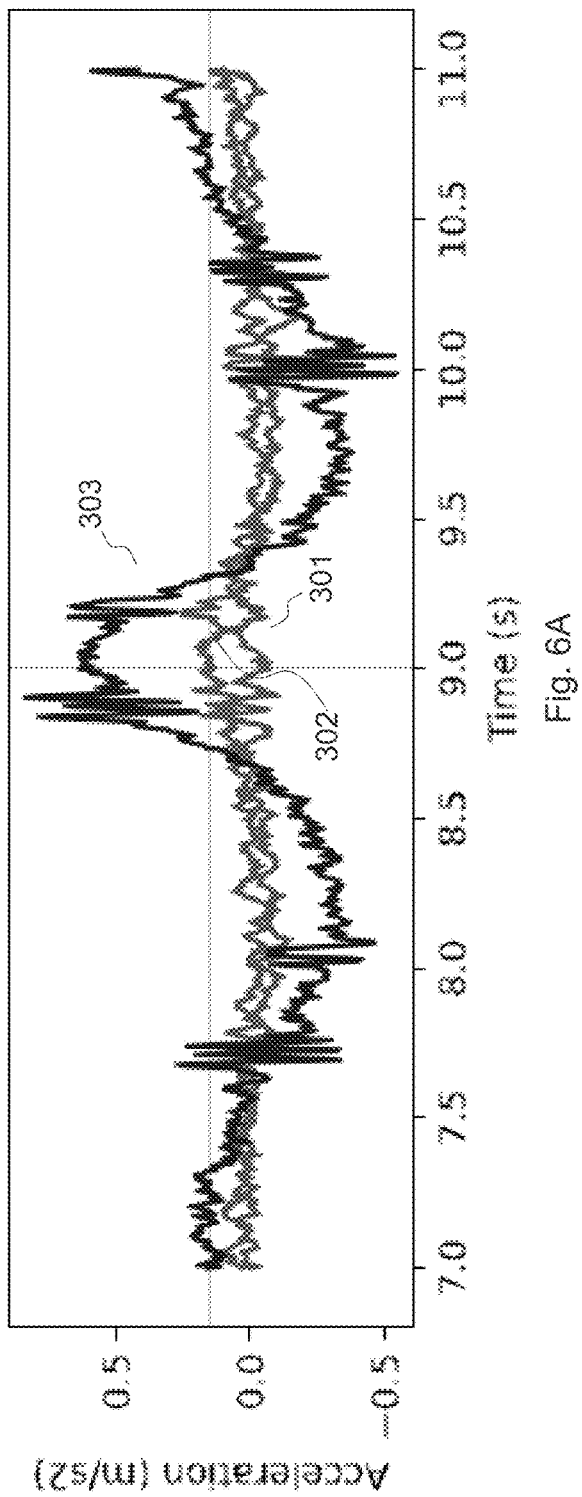
FIG. 6A is an example trace of a raw time domain signal along each of 3 axes of linear acceleration according to an example.
Figure 6B:
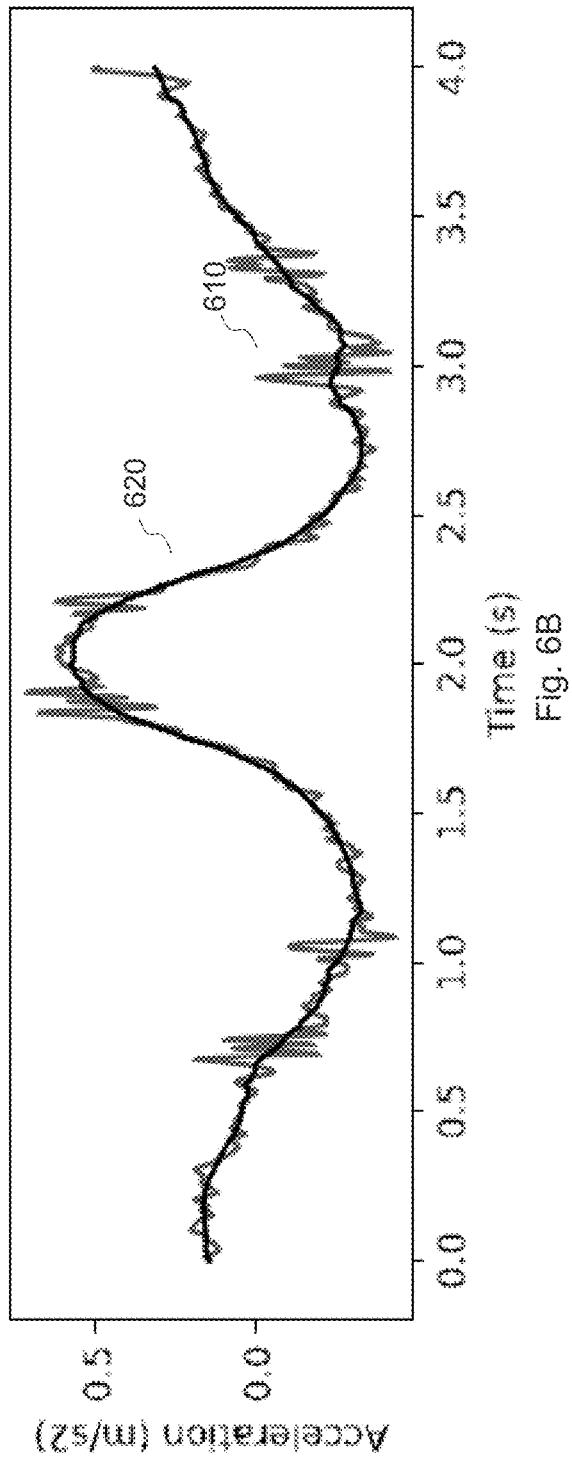
FIG. 6B is an example trace of a time domain signal along a selected axis showing a low frequency curve and high frequency perturbations thereon.

FIG. 6B illustrates the purpose and function of the separation frequency $f_s$. FIG. 6B shows a first stream of time domain samples 610 along an axis, in this case, the Z axis 230. It may be seen that the stream 610 follows a baseline, substantially low frequency, curve that is overlaid on FIG. 6B as curve 620.

Those having ordinary skill in the relevant art will recognize that the physical events of the lungs, which may include without limitation, diaphragm movements, lung muscle expansion, airflow and/or exhalation, will in general have a lower frequency than those of the heart. By way of non-limiting example, for a human vertebrate, breathing may be at a rate of about 12 breaths per minute (or about 0.2 Hz), while blood circulation may be at a rate that exceeds 60 beats per minute (or about 1 Hz). Thus, heuristically, it will be appreciated the low frequency components reflected in curve 620 correspond to physical events of the lungs and the higher frequency perturbations thereon reflected in stream 610 correspond to physical events of the heart.

In some examples, the separation frequency $f_s$ is set to substantially 2 Hz. In some examples, a different separation frequency $f_s$ may be specified for one or more of the axes.

In some examples, one or more band pass filters (BPF) having different passbands generate the two sets of streams. In some examples, the separation frequency $f_s$ is set as a lower extremity of a first passband and as an upper extremity of a second passband.

In some examples, the upper extremity of the first passband may be a maximum threshold frequency $f_{max}$ that is specified to eliminate higher frequencies that are unlikely to contain significant new information related to the physical events of the heart and are thus considered to be noise. In some examples, the maximum frequency $f_{max}$ may be set to substantially 50 Hz. In some examples, a different maximum frequency $f_{max}$ may be specified for one or more of the axes.

In some examples, the lower extremity of the second passband may be a minimum threshold frequency $f_{min}$ that is specified to eliminate baseband and/or very low frequency signals that are unlikely to contain significant new information related to the physical events of the lungs and are thus considered to be noise. In some examples, the minimum frequency $f_{min}$ may be set to substantially 0.04 Hz. In some examples, a different minimum frequency $f_{min}$ may be specified for one or more of the axes.

In some examples, the BPF(s) may be implemented in stages, with each stage comprising a different passband. In some examples, a stage of the BPF may be implemented as a high pass filter (HPF) and/or a low pass filter (LPF). In some examples, the BPF(s), HPF(s) and/or LPF(s) may be a brick wall FFT filter where all amplitudes of the signal beyond the passband are truncated.

In some examples, the output of the BPF(s) may be smoothed to account for drift and/or slow movements of the subject 20.

The Cardiac Biometric Subsystem

The cardiac biometric subsystem 320 accepts as inputs, the at least one windowed stream of axes of processed cardiac samples 301-306 and generates cardiac biometric data 321-323 as outputs. The cardiac biometric data 321-323 may, in some examples comprise any one or more of the heart rate (HR) 321, the heart rate variability (HRV) 322 and the left ventricular ejection time (LVET) 323.

The HR 321 is a biometric datum measured in units of beats per minute (bpm) that is defined as the number of times that the heart contracts per unit time. In some examples, the physical event that defines a heart contraction is the opening of the aortic valve 141. In some examples, the HR 321 is expressed in beats per minute. While conventionally, heart rate is measured as a steady state value by recording the number of contractions over a specified time period and by calculating an average heart rate therefrom, in the present disclosure, an instantaneous HR 321 may be derived by the cardiac biometric subsystem 320. The derivation of such an instantaneous HR 321 permits the derivation of the HRV 322.

The HRV 322 is a biometric datum that indicates variability of the instantaneous HR 321. In some examples, the instantaneous HR 321 permits derivation of the difference in the instantaneous HR 321 from one cardiac cycle to the next. From this information, both an instantaneous HRV 321, defined as the difference in the instantaneous HR 321 in the current cardiac cycle relative to the immediately previous cardiac cycle, and statistical calculations of the variation in the instantaneous HR 321 over varying periods of time may be derived.

The LVET 323 is a biometric datum that indicates the time interval in seconds of blood flow across the aortic valve 141. In some examples, this is indicative of the length of time that the aortic valve 141 is open over the course of each cardiac cycle. Again, in the present disclosure, an instantaneous stream of LVET 323 values may be derived.

Figure 7:
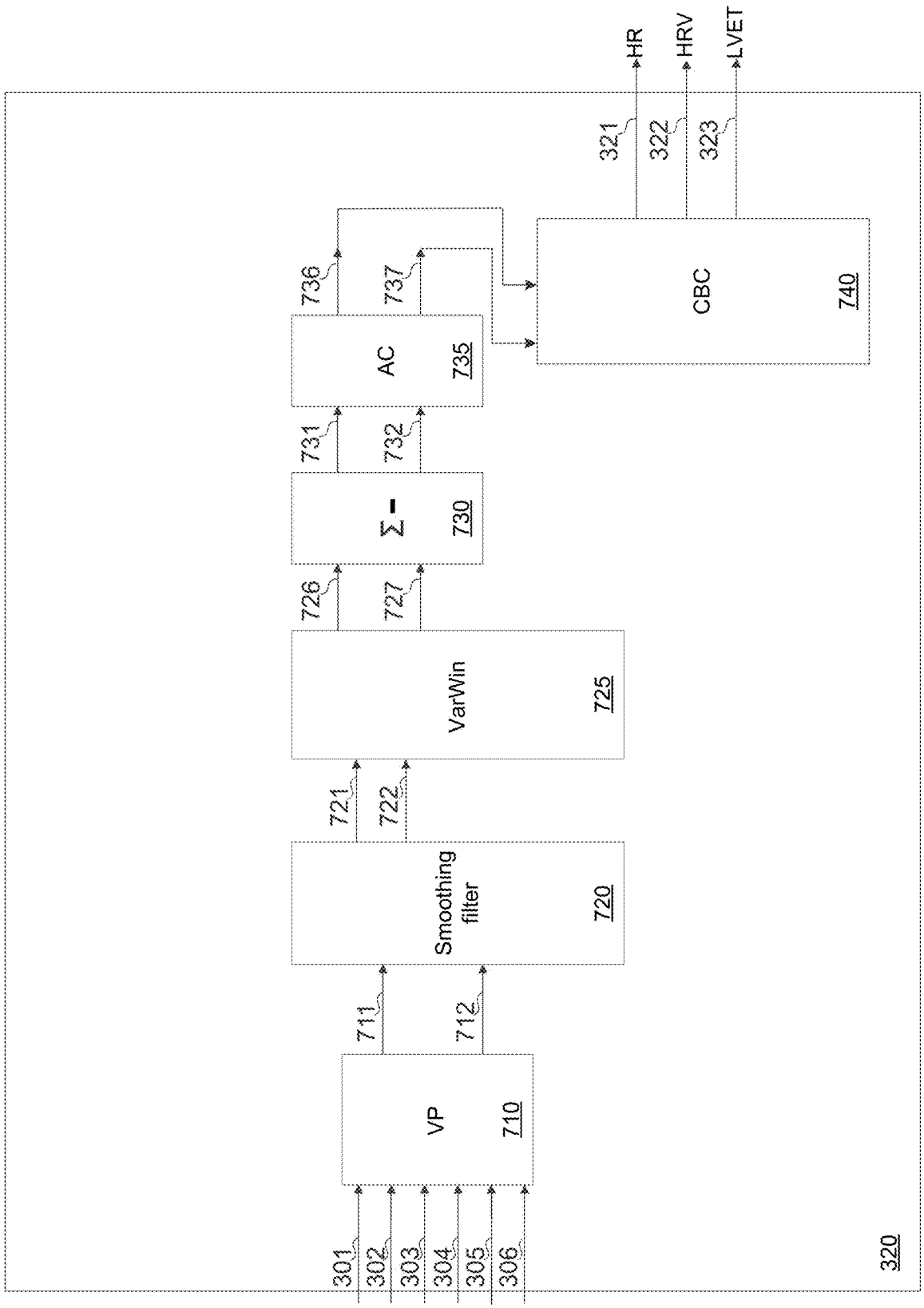
FIG. 7 is a simplified block diagram showing an example cardiac biometric subsystem of the system of FIG. 3 according to an example.

An example of the cardiac biometric subsystem 320 is shown in detail in FIG. 7. It comprises a vectorial projector (VP) 710, a smoothing filter 720, a variation in window (VarWin) function 725, a difference engine ($\Sigma$-) 730, an autocorrelator (AC) 735 and a cardiac biometric calculator (CBC) 740.

The VP 710 accepts as inputs, at least one vector comprising a windowed set of streams of samples along at least one acceleration axis 301-303, 304-306, projects them along a single axis and outputs at least one windowed stream of scalar magnitude(s) 711, 712 of each sample in the stream along the specified axis. The VP 710 outputs the at least one windowed stream of scalar magnitude(s) 711, 712 to the smoothing filter 720.

In some examples, the vector comprises windowed streams of samples along at least one linear acceleration axis 301-303 and windowed streams of samples along at least one rotational acceleration axis 304-306. In such example, a single windowed stream of scalar magnitudes 711 is output. In some examples, a plurality of vectors are employed, where a linear acceleration vector comprises windowed streams of samples along at least one linear acceleration axis 301-303 and a rotational acceleration vector comprises windowed streams of samples along at least one rotational axis 304-306. In such example, a plurality of windowed streams of scalar magnitudes 711, 712 is output, respectively corresponding to the linear acceleration vector and to the rotational acceleration vector.

In some examples, the axis along which the vector is projected is one of the axes in the vector, having the greatest change in acceleration over a given time period, which in some examples may be substantially ±4 s. In such examples, effectively, the VP 710 selects the axis within the vector that demonstrates the greatest response to vibrations recorded by the sensor 200 corresponding to physical events associated with cardiac activity of the subject 20.

In some examples, assuming optimal placement of the sensor 200 relative to the subject 20, the selected axis may be the Z axis 230 in the case of linear acceleration and the rotational axis 260 about the Z axis in the case of rotational acceleration.

In some examples, the axis along which the vector is projected is a composite of the axes in the vector. In such examples, the axis along which the vector is projected is one where the scalar magnitude 711, 712 will be a maximum for the greatest proportion of the windowed stream.

In some examples, where the projected vector is a composite of the axes in the vector, the negative axis of the projected vector may be considered to point back substantially in the direction of the source of the vibration. As such, the projected vector may provide an additional mechanism to verify that the vibrations are substantially devoid of noise components and/or to separate vibrations corresponding to physical events associated with cardiovascular activity from vibrations corresponding to physical events associated with respiratory activity.

In some examples, the selected axis will change from sample to sample. In such examples, effectively the cardiac biometric subsystem 320 adjusts and optimizes the derived results, even if the subject 20 moves or if the sensor 200 gets misaligned relative to the subject, while redistributing the energy from all supplied axes to a single one of them to maximize signal quality.

FIGS. 6A and 6B illustrate the operation of the VP 710. FIG. 6A shows a plurality of streams 301-303 of samples along, by way of non-limiting example, respectively three mutually orthogonal linear acceleration axes 210, 220, 230 that are input to the VP 710. It can be seen that perturbations along the stream 303 corresponding to the z axis 230 are most pronounced. FIG. 6B shows the output 711 of the VP 710 corresponding thereto as curve 610. In the illustrated example, the selected axis is constrained to be one of the input axes 601-603, and within such constraint, the Z axis 230 is selected, such that the output curve 610 is the same as the stream 303.

The smoothing filter 720 accepts the windowed stream(s) of scalar magnitude samples 711, 712 generated by VP 710, smoothes them and outputs at least one windowed stream of smoothed scalar magnitudes 721, 722 that it forwards to the VarWin function 725.

The smoothing filter 720 removes high frequency artefacts such as those generated by speech and/or body movements that are considered noise for purposes of deriving cardio biometric data 321-323. In some examples, the smoothing filter 720 is a moving average filter. In some examples, the smoothing filter 720 has a filter width of 0.114 s.

The VarWin function 725 accepts at least one windowed stream of smoothed scalar magnitudes 721, 722 from the smoothing filter 720, selects at least one of these streams and outputs the selected stream(s) 726, 727 to the difference engine 730.

The VarWin function 725 makes its selection by iteratively analyzing the signal represented by each stream and outputting a signal corresponding to each input signal whose value is the difference in amplitude between that point and all points within the duration of the applicable window 510, 520, 530, 540, 550 away from that point. That is, the VarWin function 725 outputs a value that corresponds to the amplitude of the corresponding input sample less the weighted mean of the amplitudes of all of the samples within the given window 510, 520, 530, 540, 550 assigned to the stream by the windowing subsystem 410. The use of different windows 510, 520, 530, 540, 550 and the assessment of peak amplitudes of the signal within each window with its associated duration allows the selection of one of these windows that best corresponds to at least one integer multiple of the current period of the cardiac cycle. This facilitates the marking of the start and the end of each cardiac cycle to improve the performance of the autocorrelator 735. In some examples, the selected window substantially corresponds to two times the current period of the cardiac cycle, which permits the CBC 740 not only to derive accurate values of the instantaneous HR 721, but also of the instantaneous HRV 722 and the instantaneous LVET 723, given that these latter cardiac biometric data involve two complete cardiac cycles, as discussed below.

Additionally, the ability to change, on an ongoing basis, over time, which window 510, 520, 530, 540, 550 is being used provides a rough auto-adjustment capability to accommodate variability between subjects 20 and/or variability within the measurements over time of a single subject 20, including without limitation, changes in the cardiac condition and/or subject exertion without involving retraining of the autocorrelator 735.

The at least one stream of outputs 726, 727 of the VarWin function 725 corresponding respectively to the at least one input stream 721,722 is output to the difference engine 730.

The difference engine 730 accepts as inputs the at least one stream 726, 727 and generates at least one respective stream of outputs 731, 732 that it forwards to the autocorrelator 735. The difference engine subtracts the weighted mean of the amplitudes of all of the samples within the selected windowed stream (which in some examples is a moving average calculated by the smoothing filter 720) from the amplitude of each sample and squares the result. This normalizes the signal amplitude and provides a clear signal against which to apply autocorrelation. Additionally, this enables "binning" of the peaks, provides improved results from the autocorrelator 735 and may reduce computational time and/or complexity.

Figure 8:
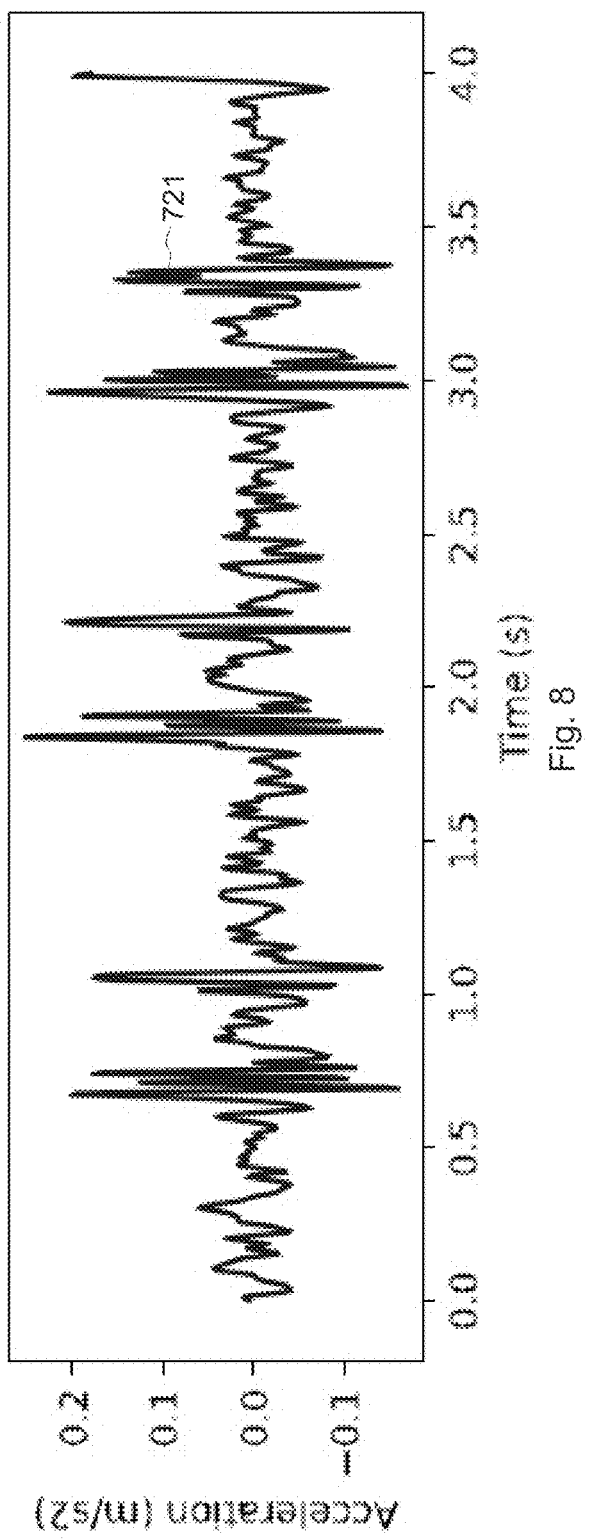
FIG. 8 is an example trace of a time domain signal after processing by a smoothing filter within the cardiac biometric subsystem of FIG. 7 according to an example.
Figure 9:
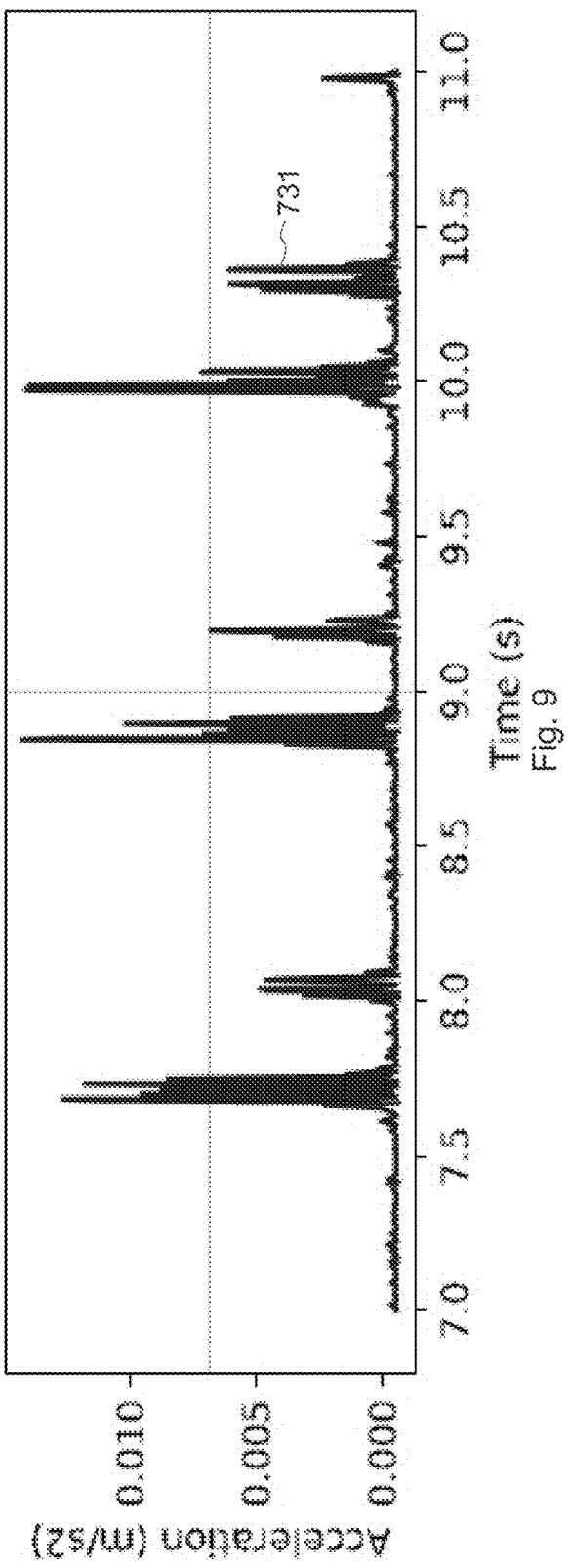
FIG. 9 is an example trace of a time domain signal after processing by a variation in window module and a difference engine within the cardiac biometric subsystem of FIG. 7 according to an example.

This may be seen by comparing FIG. 8 with FIG. 9. FIG. 8 shows an example trace of the signal 721 and FIG. 9 shows a corresponding example trace of the signal 731. In some examples, as seen in the example trace 731 of FIG. 9, the weighted mean of the amplitudes that is subtracted from all of the samples may be adjusted to ensure that the resulting substantially flat portion, for example between 7.0 and 7.5 on the Figure, lie below the 00 axis, so that there will be a plurality of zero crossings, which will facilitate the processing, discussed below, by the autocorrelator 735.

The autocorrelator 735 accepts as inputs the at least one stream 731, 732 output by the difference engine 730 compares the input waveform(s) against a time-delayed version of itself, resulting in at least one corresponding output waveform 736, 737 that is output to the cardiac biometric calculator 740.

Figure 10:
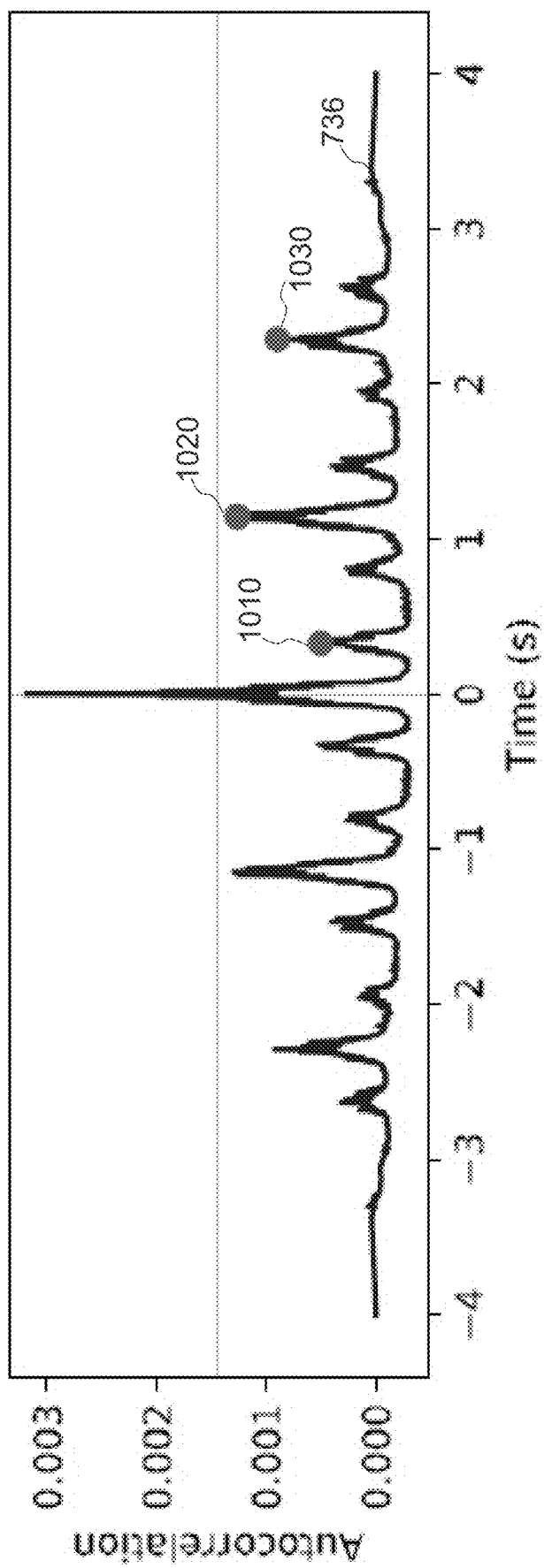
FIG. 10 is an example trace of the output of an autocorrelator within the cardiac biometric subsystem of FIG. 7 according to an example.

The output waveform 736, 737, a non-limiting example of which is shown in FIG. 10, shows amplified signals where features are similar to or indeed shared between the input waveform and the time-delayed waveform of itself. The relative amplitude of the peaks in the output waveform 736, 737 represent points of relatively higher correlation between the input waveform and its time-delayed version.

The autocorrelator 735 achieves this by convolving the input signal 731, 732 with a time-delayed copy of itself to find repeating patterns. In some examples, the time delay corresponds to the duration of the corresponding window 510, 520, 530, 540, 550 applied by the windowing subsystem 410 and as selected by the VarWin function 725. In some examples, the time delay may be a fraction of such duration. In some examples, the time delay may be progressively altered until a maximum autocorrelation is achieved, in which case the time delay used to obtain such maximum may be related to an integer multiple of the period of the cardiac cycle modelled by the at least one input signal 731, 732.

The cardiac biometric calculator 740 accepts the at least one signal 736, 737 output by the autocorrelator 735 and derives a stream of instantaneous values for the cardiac biometric data HR 321, HRV 322 and LVET 323.

Figure 11:
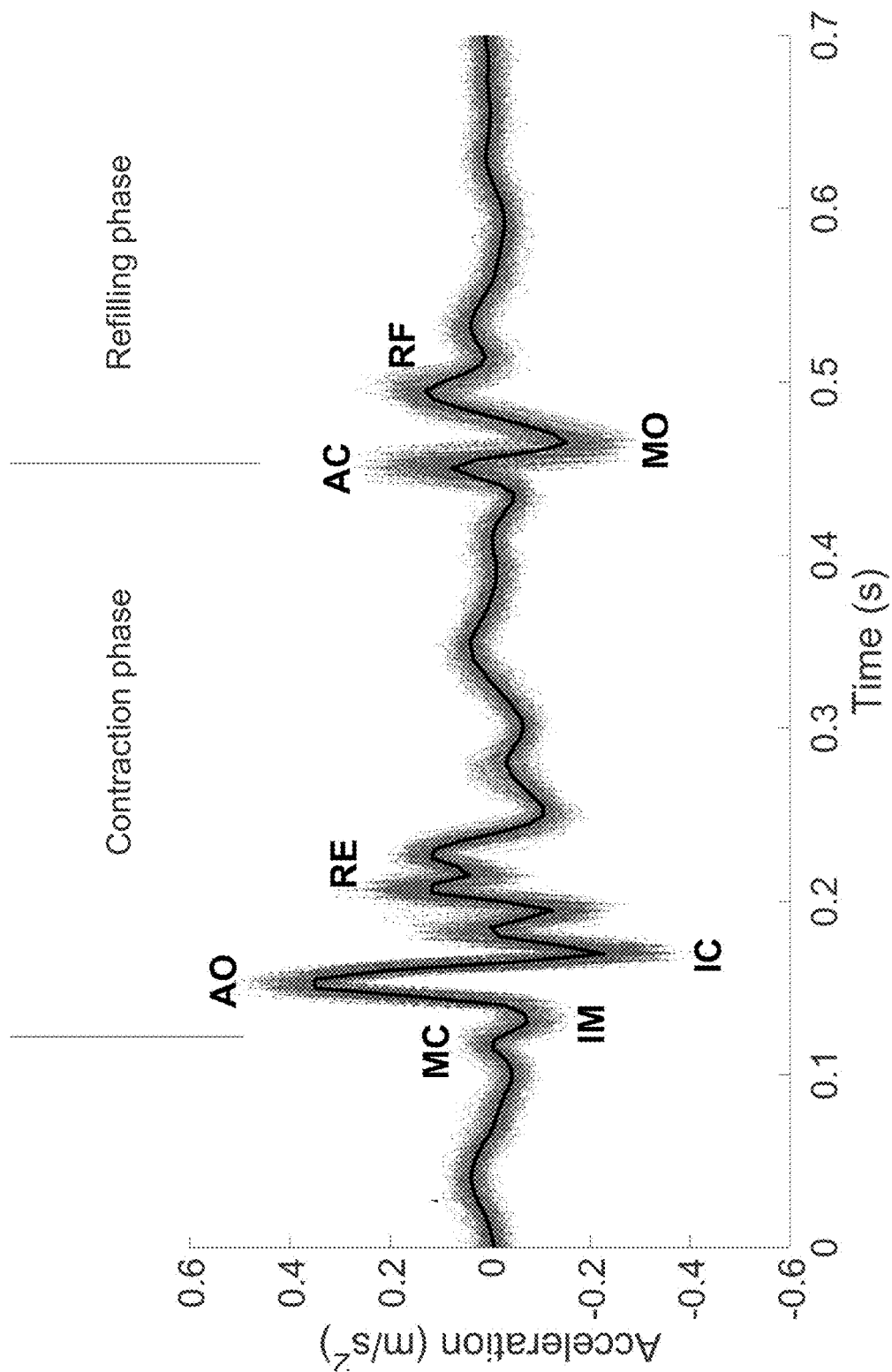
FIG. 11 is a composite drawing showing a plurality of example cycles of an SCG time domain signal overlaying each other and a representative SCG time domain signal representative thereof according to an example.

The derived cardiac biometric data from the at least one signal 736, 737 may be seen having regard to FIG. 11 which shows an example of a portion of a time domain SCG waveform to illustrate salient features of the waveform that may be identified by the autocorrelator 735 in conjunction with the cardiac biometric calculator 740. The thickened curve represents the overlay of a large number of cycles of the cardiac cycle for substantially a single cycle thereof. It demonstrates that the time domain SCG waveform follows a characteristic pattern, which is shown by the solid line intermediate the thickened curve.

Within a single cardiac cycle represented by the solid line, there are certain cardiac events that have characteristics that lend themselves to detection by the system 300 using SCG and/or GCG. These include, without limitation, the following labelled points on FIG. 11:

in the contraction phase of the cardiac cycle:
MC: mitral valve 123 closure,
IM: isovolumetric moment,
AO: aortic valve 141 opening,
IC: isotonic contraction, and
RE: rapid ejection of blood to the body; and in the refilling phase of the cardiac cycle:
AC: aortic valve 141 closure for refilling the left ventricle 140,
MO: mitral valve 123 opening, and
RF: rapid flow of blood refilling the heart.

Those having ordinary skill in the relevant art will recognize certain terms identified above and the underlying physical event represented thereby. By way of non-limiting example, such person would appreciate that the closure of the mitral valve 123 precedes the ejection of blood through the aorta 170 and might reason that ejection of blood at high velocity from the left ventricle 140 may generate a significant and detectable vibration.

Viewed in this fashion, the cardiac cycle represented by FIG. 11 may be understood as a cyclical process in which the autocorrelator 735 can detect and quantify cardiac biometric data. In such a cyclical SCG-measured process, in the contraction phase, mitral valve 123 closure (MC) is followed by a period (IM) where the volume of blood and the heart does not substantially change and no significant vibrations are identifiable. Thereafter, the opening (AO) of the aortic valve 141 releases the reservoir of blood from the left ventricle 170. The isotonic contraction (IC) represents the contraction that ejects the blood through the in the systolic phase, aortic valve 141. RE represents the removal of blood through the aorta 170 and may be reflected in a significant vibration due to the volume and rate of flow of blood being removed.

In the refilling phase, the heart is effectively refilling, which is achieved by closing the left ventricle 170 and opening the mitral valve 123 to allow flow from the left atrium 120 into the left ventricle 170. RF represents the flow of blood during the period between mitral valve 123 opening (MO) and mitral valve 123 closure (MC).

In FIG. 10, a plurality of peaks are shown. The peak at time 0 represents autocorrelation of the input signal 731, 732, with itself, without time delay and thus is not of any substantial interest. Similarly the peaks at negative times are artefacts of the autocorrelation that need not be discussed separately.

This leaves the peaks marked 1010, 1020, 1030. Peak 1010 represents the correlation between the AO peak in the first cardiac cycle with the AC peak in the same cardiac cycle. As such, the time delay between the autocorrelation time peak at time 0 and the peak 1010 represents the instantaneous LVET for the first cardiac cycle.

Peak 1020 represents the correlation between the AO peak in the first cardiac cycle with the AO peak in the next (second) cardiac cycle. As such, the time delay between the autocorrelation time peak at time 0 and the peak 1020 represents the instantaneous period $T^1$ of the first cardiac cycle. The instantaneous HR 321 corresponding thereto, denoted $HR^1$ may be derived from this instantaneous period by the equation:

$$HR^1 = (60/T^1).$$

Peak 1030 represents the correlation between the AO peak in the second cardiac cycle with the third cardiac cycle. As such, the time delay between peak 1020 and peak 1030 represents the instantaneous period $T^2$ of the second cardiac cycle, from which a corresponding instantaneous HR 321, denoted $HR^2$ may be derived in like manner. From the values of $HR^1$ and $HR^2$, an instantaneous HRV 322, denoted $HRV^{1-2}$ may be derived by the equation:

$$HRV^{1-2} = HR^1 - HR^2.$$

Thus, as indicated above, a window selected by the VarWin function 725 that substantially corresponds to two times the current period of the cardiac cycle, will allow the derivation of instantaneous values for HR 321, HRV 322 and LVET 323.

It will be appreciated that there exist lesser peaks between peak 1010 and peak 1020 and between peak 1020 and peak 1030, as well as a complementary mirror image of peaks along the negative time axis. It may be appreciated that these are artefacts of the autocorrelation process and do not provide substantial additional information.

The peaks of significance in the example waveform of FIG. 11 are identified and quantified by the cardiac biometric calculator 740. The cardiac biometric calculator 740 accepts as inputs the autocorrelated linear acceleration signal 736 and/or the autocorrelated rotational acceleration signal 737 and picks out the peaks of significance 1010, 1020, 1030 from them.

In the present disclosure, the cardiac biometric calculator 740 identifies the peak 1010 by identifying a maximum positive change in acceleration followed by a maximum negative change in acceleration in the at least one signal 736, 737 output by the autocorrelator 735. With reference to FIG. 11, this may be seen to involve the IM-AO upward transition, followed immediately by the AO-IC negative transition. The steepness of both transitions, as well as the fact that they follow substantially immediately one after the other facilitates their identification, from which the location along the time axis of the AO inflection point may be determined, corresponding to peak 1010.

Accordingly, for the SCG input signal 736, the AO peak may be detected by the autocorrelator 735 comparing the signal 736, within an appropriate window as determined by the VarWin function 725 between a point and all values within such window around that point and selecting the feature that has the greatest energy (corresponding to the greatest autocorrelation. For the GCG input signal 737, a similar mechanism may be employed, albeit with changes because of the different nature of the characteristic shape of the signal.

In some examples, the delay may be derived by centroid fitting the peaks in the waveform and/or autocorrelation by the autocorrelator 735 and selecting different delay values as discussed above, until a maximum autocorrelated response is obtained.

Once the HR 321 has been derived, it may be monitored on an ongoing peak-to-peak basis, allowing an instantaneous HRV 322 to be derived by quantifying the difference in time period between consecutive peak-to-peak transitions.

Once the HR 321 and HRV 322 have been obtained through identification of the AO cardiac event, the cardiac biometric calculator 740 may set the amplitude of the corresponding AO peak to 0 and recommence a search for the (next) largest peak. Having regard to FIG. 11, this typically is the AC peak and may be identified by the AC-MO transition and the fact that it is a certain distance away from the AO peak (which allows IC-RE transitions to be ignored).

Once the AC peak has thus been identified, the time interval between the AO peak and the AC peak results in derivation of the instantaneous LVET 323. LVET has been described as being indicative of the power and efficiency of the heart It will be appreciated that similar methodologies may be employed to measure any cardiac metric that is related to time intervals.

The Respiratory Biometric Subsystem

The respiratory biometric subsystem 330 accepts as inputs the at least one windowed stream of axes of processed respiratory samples 311-316, together with the at least one windowed stream of axes of raw windowed samples 411-416 corresponding thereto, and generates respiratory biometric data 331-333 as outputs. The respiratory biometric data 331-333 may, in some examples comprise any one or more of the respiratory rate (RR) 331, the respiratory phase (RP) 332 and the respiratory volume (RV) 333.

The RR 331 is a biometric datum measured in units of respirations per minute (rpm) that is defined as the number of respiration (inhalation/exhalation) cycles that the lungs undergo per unit time. In some examples, the RR 331 is expressed in respirations per minute. While conventionally, respiration rate is measured as a steady state value by recording the number of respiration cycles over a specified time period and by calculating an average respiratory rate therefrom, in the present disclosure, an instantaneous RR 331 may be derived by the respiratory biometric subsystem 330 for each respiration cycle.

The RP 332 is a biometric datum that is defined as the ratio of the time during which the lungs are in inhalation relative to the time during which the lungs are in exhalation. Again, while conventionally, respiratory phase is determined as a steady state value, in the present disclosure, an instantaneous RP 332 may be derived by the respiration biometric subsystem 330 for each respiratory cycle.

The RV 333 is a biometric datum that is defined as the ratio of the (absolute value) of the maximum amplitude of the inhalation phase of a single respiration cycle relative to the (absolute value) of the maximum amplitude of the exhalation phase of the same respiration cycle. Again, while conventionally, an analog of the respiratory volume is determined as a steady state value, in the present disclosure, an instantaneous RV 333 may be derived by the respiratory biometric subsystem 330 for each respiratory cycle.

Figure 12:
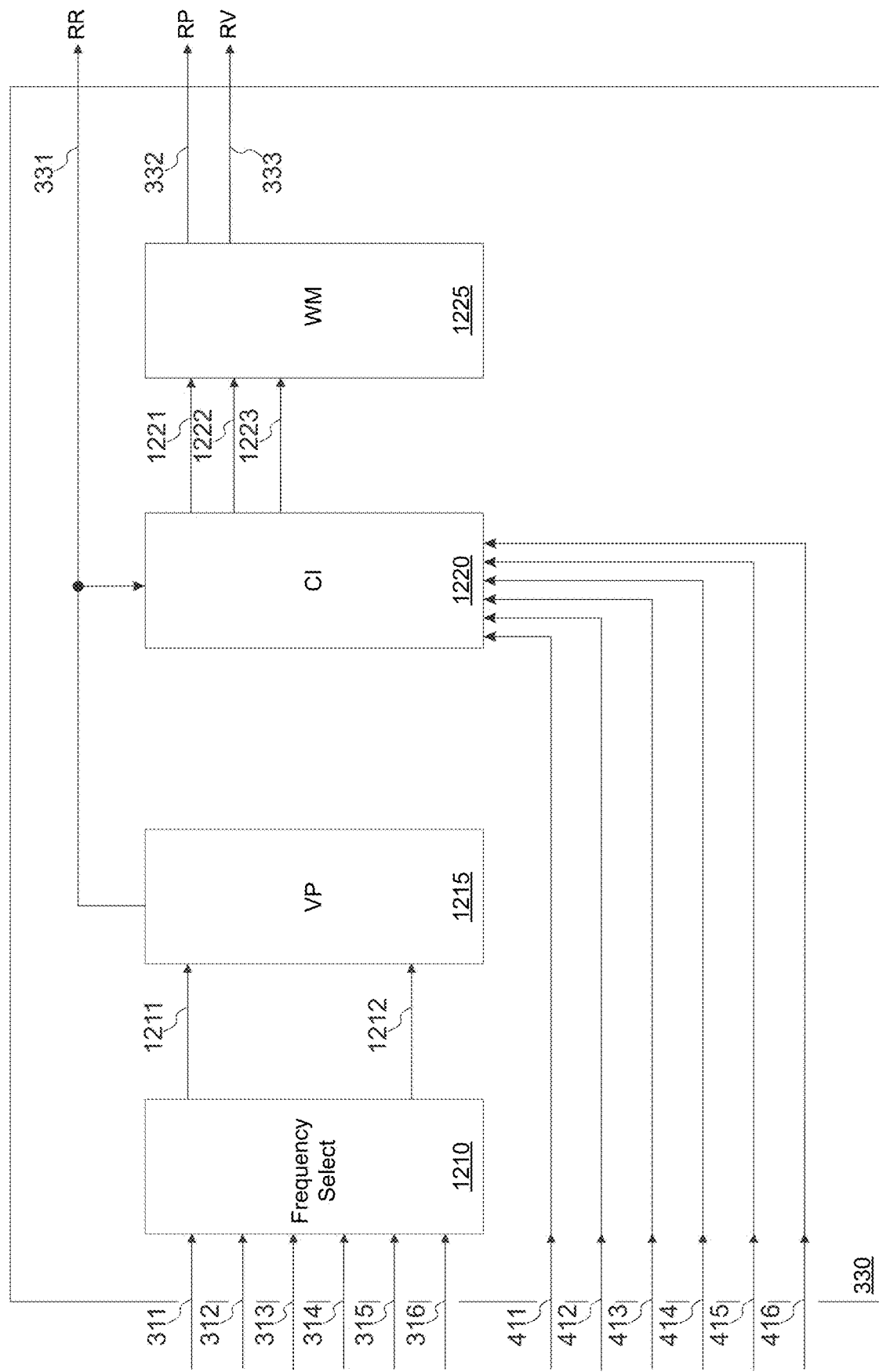
FIG. 12 is a simplified block diagram showing an example respiratory biometric subsystem of the system of FIG. 3 according to an example.

An example of the respiratory biometric subsystem 330 is shown in detail in FIG. 12. It comprises a frequency selector 1210, a VP 1215, a cycle isolator (CI) 1220 and a waveform matcher (WM).

The frequency selector 1210 accepts as inputs, the at least one windowed stream of axes of processed respiratory samples 311-316 and generates as output, at least one windowed stream of axes of samples of a common selected frequency 1211 corresponding to any of the at least one windowed stream of axes of processed respiratory samples 311-316.

In some examples, the input to the frequency selector 1210 is a single windowed stream corresponding to both linear acceleration 311-313 and rotational acceleration 314-316. In such examples, a single windowed stream of axes of samples of a common selected frequency 1211 is output.

In some examples the input to the frequency selector 1210 is at least one windowed stream corresponding to linear acceleration 311-313 and/or rotational acceleration 314-316. In such examples, a windowed stream of linear acceleration axes of samples of a common selected frequency 1211 and/or a windowed stream of rotational acceleration axes of samples of a common selected frequency 1212 is output.

The selected frequency is one that the respiratory cycle is considered to predominantly follow in each sample group in the stream. In some examples, the selected frequency is the maximum, minimum, mean or another intermediate frequency detected in the corresponding input for the stream.

VP 1215 is similar to VP 710 in the cardiac biometric subsystem 310 in that it accepts at least one windowed stream of axes of samples of a common selected frequency 1211, 1212 and outputs at least one windowed stream of scalar magnitude(s) along a selected axis at the selected frequency.

Given that the output of VP 1215 comprises a stream of scalar magnitude(s) of a single frequency, the stream of frequency samples comprises the instantaneous RR 331.

The instantaneous RR 331 is provided as an input, along with the at least one windowed stream of axes of raw windowed samples 411-416 to the CI 1220, in order to permit derivation of the remaining respiratory biometric data, namely RP 332 and/or RV 333.

The CI 1220 accepts as inputs, the RR 331, together with the at least one windowed stream of axes of raw windowed samples 411-416. The CI 1220 fits a sinusoidal function to the at least one windowed stream of raw windowed samples 411-416 using the instantaneous RR 331 derived by the VP 1215. Each cycle of such sinusoidal function has a period equivalent to the inverse of the instantaneous RR 331 corresponding thereto. The CI 1220 fits the sinusoidal function to match, for each cycle, from the samples corresponding thereto, each of a point of zero-crossing from an initial positive half-cycle to a subsequent negative half-cycle, a maximum amplitude in the positive half-cycle and a maximum amplitude of the negative half-cycle in the at least one windowed stream of raw windowed samples 411-416. It will be appreciated that the positive half-cycle corresponds to an inhalation phase of the respiration cycle and the negative half-cycle corresponds to the exhalation phase thereof.

The CI 1220 sequentially outputs a single cycle 1221 of the derived sinusoidal function to the waveform matcher 1225. Concurrently, the CI 1220 outputs at least one set of samples 1222, 1223 from the at least one windowed stream of raw windowed samples 411-416 corresponding to the cycle 1221 to the waveform matcher 1225.

In some examples, the input to the CI 1220 is a single windowed stream corresponding to both linear acceleration 411-413 and rotational acceleration 414-416. In such examples, a single set of samples 1222 is output.

In some examples, the input to the CI 1220 is at least one windowed stream corresponding to linear acceleration 411-413 and/or rotational acceleration 414-416. In such examples, a set of samples 1222 corresponding to linear acceleration and/or a set of samples 1223 corresponding to rotational acceleration is output.

The waveform matcher 1225 uses the single cycle of the derived sinusoidal function 1221, and the at least one set of samples 1222, 1223 to derive the RP 332 from the relative position of the zero crossing within the period of the cycle. Similarly, the waveform matcher 1225 uses the single cycle of the derived sinusoidal function 1221 and the at least one set of samples 1222, 1223 to derive the RV 333 from the difference in the maximum positive amplitude and the maximum negative amplitude.

Method Actions

Figure 13:
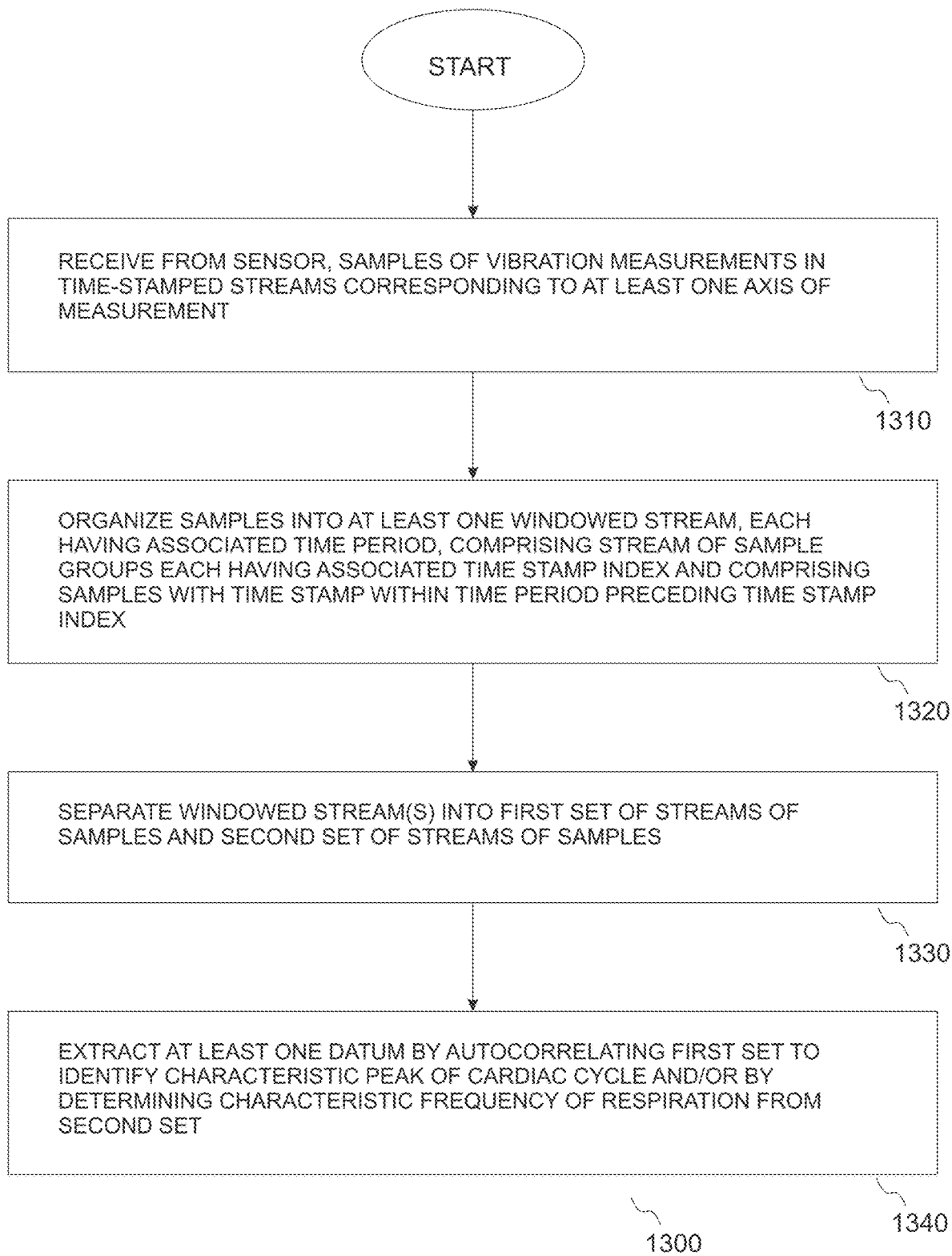
FIG. 13 is a flow chart illustrating an example of a method at an instrument for non-invasively deriving at least one biometric datum of a living vertebrate, according to an example.

Turning now to FIG. 13, there is shown a flow chart, shown generally at 1300, of example actions taken at an instrument 300 for non-invasively deriving at least one biometric datum 321-323, 331-333 of a living vertebrate 20.

One example action 1310 is to receive, from a sensor 200 positioned against the vertebrate 20, samples of measurements, by the sensor, of vibrations within a body of the vertebrate 20, in at least one time-stamped stream that corresponds to at least one associated axis 201-206 of measurement of at least one of linear and rotational acceleration.

One example action 1320 is to organize the samples into at least one windowed stream 411-416, each windowed stream 411-416 having an associated time period 510, 520, 530, 540, 550 and comprising a stream of sample groups, each group having an associated monotonously changing time stamp index and comprising samples having a time stamp that lies within the time period 510, 520, 530, 540, 550 that precedes a time representing the index.

One example action 1330 is to separate the at least one windowed stream 411-416 into a first set of streams 301-306 corresponding to physical events of the vertebrate 20 associated with cardiovascular activity and a second set of streams 311-316 corresponding to physical events of the vertebrate 20 associated with respiration.

One example action 1340 is to extract the at least one datum 321-323, 331-333 from at least one of the first set of streams 301-306, by autocorrelating the first set of streams 301-306 with a time-delayed version thereof 301-306 to identify at least one characteristic peak of a cardiac cycle of the vertebrate 20, and the second set of streams 311-316, by determining a characteristic frequency of respiration of the vertebrate 20.

It will be apparent that various modifications and variations may be made to the embodiments disclosed herein, consistent with the present disclosure, without departing from the spirit and scope of the present disclosure.

In the foregoing disclosure, for purposes of explanation and not limitation, specific details are set forth such as particular architectures, interfaces, techniques, etc. in order to provide a thorough understanding of the present disclosure. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the described methods. It is understood that such apparatus, articles of manufacture, and computer data signals also come within the scope of the present disclosure.

The present disclosure can be implemented in digital electronic circuitry, or in computer hardware, firmware, software, or in combination thereof. Apparatus of the disclosure can be implemented in a computer program product tangibly embodied in a machine-readable storage device for execution by a programmable processor; and methods and actions can be performed by a programmable processor executing a program of instructions to perform functions of the disclosure by operating on input data and generating output.

The disclosure can be implemented advantageously on a programmable system including at least one input device, and at least one output device. Each computer program can be implemented in a high-level procedural or object-oriented programming language or in assembly or machine language, if desired; and in any case, the language can be a compiled or interpreted language. Further, the foregoing description of one or more specific embodiments does not limit the implementation of the invention to any particular computer programming language, operating system, system architecture or device architecture.

The processor executes instructions, codes, computer programs, scripts which it accesses from hard disk, floppy disk, optical disk (these various disk based systems may all be considered secondary storage), ROM, RAM, or the network connectivity devices. Multiple processors may be present. Thus, while instructions may be discussed as executed by a processor, the instructions may be executed simultaneously, serially, or otherwise executed by one or multiple processors.

When provided by a processor, the functions may be provided by a single dedicated processor, by a single shared processor, or by a plurality of individual processors, some of which may be shared or distributed. The functions of the various elements including functional blocks labelled as "modules", "processors" or "controllers" may be provided through the use of dedicated hardware, as well as hardware capable of executing software in association with appropriate software with sufficient processing power, memory resources, and network throughput capability to handle the necessary workload placed upon it. Moreover, explicit use of the term "module", "processor" or "controller" should not be construed to refer exclusively to hardware capable of executing software, and may include, without limitation, digital signal processor (DSP) hardware, read-only memory (ROM) for storing software, random access memory (RAM) and non-volatile storage.

Suitable processors include, by way of example, both general and specific microprocessors. Generally, a processor will receive instructions and data from a read-only memory or a random access memory. Generally, a computer will include one or more mass storage devices for storing data file; such devices include magnetic disks and cards, such as internal hard disks, and removable disks and cards; magneto-optical disks; and optical disks. Storage devices suitable for tangibly embodying computer program instructions and data include all forms of volatile and non-volatile memory, including by way of example semiconductor memory devices, such as EPROM, EEPROM, and flash memory devices; magnetic disks such as internal hard disks and removable disks; magneto-optical disks; CD-ROM and DVD-ROM disks; and buffer circuits such as latches or flip flops. Any of the foregoing can be supplemented by, or incorporated in ASICs (application-specific integrated circuits), FPGAs (field-programmable gate arrays), DSPs (digital signal processors) or GPUs (graphics processing units) including, without limitation, general purpose GPUs.

Examples of such types of computer are programmable processing systems suitable for implementing or performing the apparatus or methods of the disclosure. The system may comprise a processor, (which may be referred to as a central processor unit or CPU), which may be implemented as one or more CPU chips, and that is in communication with memory devices including secondary storage, read only memory (ROM), a random access memory, a hard drive controller, or an input/output devices or controllers, and network connectivity devices, coupled by a processor bus.

Secondary storage is typically comprised of one or more disk drives or tape drives and is used for non-volatile storage of data and as an over-flow data storage device if RAM is not large enough to hold all working data. Secondary storage may be used to store programs which are loaded into RAM when such programs are selected for execution. The ROM is used to store instructions and perhaps data which are read during program execution. ROM is a non-volatile memory device which typically has a small memory capacity relative to the larger memory capacity of secondary storage. The RAM is used to store volatile data and perhaps to store instructions. Access to both ROM and RAM is typically faster than to secondary storage.

I/O devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) or global system for mobile communications (GSM) radio transceiver cards, and other well-known network devices. These network connectivity devices may enable the processor to communicate with an Internet or one or more intranets. The network connectivity devices may also include one or more transmitter and receivers for wirelessly or otherwise transmitting and receiving signal as are well known. With such a network connection, it is contemplated that the processor might receive information from the network, or might output information to the network in the course of performing the above-described method steps.

Such information, which is often represented as data or a sequence of instructions to be executed using the processor for example, may be received from and outputted to the network, for example, in the form of a computer data baseband signal or signal embodied in a carrier wave. The baseband signal or signal embodied in the carrier wave generated by the network connectivity devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several well known methods.

Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions and other devices.

While example embodiments are disclosed, this is not intended to be limiting. Rather, the general principles set forth herein are considered to be merely illustrative of the scope of the present disclosure and it is to be further understood that numerous changes covering alternatives, modifications and equivalents may be made without straying from the scope of the present disclosure, as defined by the appended claims.

For example, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the spirit and scope disclosed herein.

In particular, features from one or more of the above-described embodiments may be selected to create alternative embodiments comprised of a sub-combination of features which may not be explicitly described above. In addition, features from one or more of the above-described embodiments may be selected and combined to create alternative embodiments comprised of a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

In some instances, detailed descriptions of well-known devices, circuits, and methods are omitted so as not to obscure the description of the present disclosure with unnecessary detail. All statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

While the present disclosure is sometimes described in terms of methods, a person of ordinary skill in the art will understand that the present disclosure is also directed to various apparatus including components for performing at least some of the aspects and features of the described methods, be it by way of hardware components, software or any combination of the two, or in any other manner.

Certain terms are used throughout to refer to particular components. Manufacturers may refer to a component by different names. Use of a particular term or name is not intended to distinguish between components that differ in name but not in function.

The terms "including" and "comprising" are used in an open-ended fashion, and thus should be interpreted to mean "including, but not limited to". The terms "example" and "exemplary" are used simply to identify instances for illustrative purposes and should not be interpreted as limiting the scope of the invention to the stated instances. In particular, the term "exemplary" should not be interpreted to denote or confer any laudatory, beneficial or other quality to the expression with which it is used, whether in terms of design, performance or otherwise.

The terms "couple" and "communicate" in any form are intended to mean either a direct connection or indirect connection through some interface, device, intermediate component or connection, whether electrically, mechanically, chemically, or otherwise.

Directional terms such as "upward", "downward", "left" and "right" are used to refer to directions in the drawings to which reference is made unless otherwise stated. Similarly, words such as "inward" and "outward" are used to refer to directions toward and away from, respectively, the geometric center of the device, area or volume or designated parts thereof. Moreover, all dimensions described herein are intended solely to be by way of example for purposes of illustrating certain embodiments and are not intended to limit the scope of the disclosure to any embodiments that may depart from such dimensions as may be specified.

References in the singular form include the plural and vice versa, unless otherwise noted.

As used herein, relational terms, such as "first" and "second", and numbering devices such as "a", "b" and the like, may be used solely to distinguish one entity or element from another entity or element, without necessarily requiring or implying any physical or logical relationship or order between such entities or elements.

All statements herein reciting principles, aspects and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated that block diagrams reproduced herein can represent conceptual views of illustrative components embodying the principles of the technology.

The purpose of the Abstract is to enable the relevant patent office or the public generally, and specifically, persons of ordinary skill in the art who are not familiar with patent or legal terms or phraseology, to quickly determine from a cursory inspection, the nature of the technical disclosure. The Abstract is neither intended to define the scope of this disclosure, which is measured by its claims, nor is it intended to be limiting as to the scope of this disclosure in any way.

The structure, manufacture and use of the presently disclosed embodiments have been discussed above. While example embodiments are disclosed, this is not intended to be limiting the scope of the presently described embodiments. It should be appreciated, however that the present disclosure, which is described by the claims and not by the implementation details provided, which can be modified by omitting, adding or replacing elements with equivalent functional elements, provides many applicable inventive concepts that may be embodied in a wide variety of specific contexts. The specific embodiments discussed are merely illustrative of specific ways to make and use the disclosure, and do not limit the scope of the present disclosure. Rather, the general principles set forth herein are considered to be merely illustrative of the scope of the present disclosure.

In particular, features from one or more of the above-described embodiments may be selected to create alternative embodiments comprised of a sub-combination of features that may not be explicitly described above. In addition, features from one or more of the above-described embodiments may be selected and combined to create alternative embodiments comprised of a combination of features that may not be explicitly described above. Features suitable for such combinations and sub-combinations would be readily apparent to persons skilled in the art upon review of the present application as a whole. The subject matter described herein and in the recited claims intends to cover and embrace all suitable changes in technology. Further, the various elements or components may be combined or integrated in another system or certain features may be omitted, or not implemented. Also, techniques, systems, subsystems and methods described and illustrated in the various embodiments as discrete or separate may be combined or integrated with other systems, modules, techniques, or methods without departing from the scope of the present disclosure. Other examples of changes, substitutions, and alterations are easily ascertainable and could be made without departing from the scope disclosed herein.

It will be apparent that various modifications and variations covering alternatives, modifications and equivalents will be apparent to persons having ordinary skill in the relevant art upon reference to this disclosure and the practice of the embodiments disclosed therein and may be made to the embodiments disclosed herein, without departing from the present disclosure, as defined by the appended claims.

Other embodiments consistent with the present disclosure will be apparent from consideration of the specification and the practice of the disclosure disclosed herein. Accordingly the specification and the embodiments disclosed therein are to be considered examples only, with a true scope and spirit of the disclosure being disclosed by the following numbered claims:

What is claimed is:

1. A method of non-invasively deriving at least one biometric datum, of a living vertebrate, comprising actions, at an instrument, of:
receiving, from a sensor positioned against the vertebrate, time-domain samples of measurements, by the sensor, of vibrations within a body of the vertebrate that correspond to a seismocardiogram (SCG) signal, in at least one time-stamped stream that corresponds to at least one associated axis of measurement of at least one of linear and rotational acceleration;
organizing the samples into a plurality of windowed streams, each windowed stream having an associated time period and comprising a stream of sample groups, each group having an associated monotonously changing time stamp index and comprising samples having a time stamp that precedes a time represented by the index;
separating the plurality of windowed streams into a first set of streams corresponding to physical events of the vertebrate associated with cardiovascular activity and a second set of streams corresponding to physical events of the vertebrate associated with respiration;
extracting the at least one datum from at least one of:
a selected one of the first set of streams whose associated time period is substantially an integer multiple of a period of a cardiac cycle of the vertebrate by autocorrelating the first set of streams with a time-delayed version thereof to identify at least one characteristic peak of a cardiac cycle, corresponding to a cardiac event within the cardiac cycle, of the vertebrate, and
the second set of streams by determining a characteristic frequency of respiration of the vertebrate;
identifying consecutive peaks associated with opening of an aortic valve (AO) in successive cardiac cycles and calculating a maximum positive acceleration followed by a maximum negative acceleration; and
determining a peak associated with closing of the aortic valve (AC) in a cardiac cycle for which a peak associated with opening thereof has been identified and deriving a left ventricle ejection time (LVET) from a time difference therebetween.

2. The method according to claim 1, wherein the at least one axis of measurement is selected from a group consisting of three mutually orthogonal linear acceleration axes and three rotational accelerations about the three linear acceleration axes.

3. The method according to claim 2, wherein the sensor is positioned substantially over a chest cavity of the vertebrate.

4. The method according to claim 3, wherein the sensor is positioned proximate to a xiphoid process of a sternum of the vertebrate with at least one of the linear acceleration axes being oriented toward a right side of the vertebrate substantially along a sinistrodexter thereof.

5. The method according to claim 1, wherein the samples are recorded at a frequency that exceeds an expected maximum frequency of the vibrations by at least a factor of 10.

6. The method according to claim 5, wherein the samples are recorded at a frequency that is less than a maximum sampling frequency that can be processed in real-time.

7. The method according to claim 1, wherein the associated time period is at least one of 2 s, 4 s, 6 s, 8 s and 10 s.

8. The method according to claim 1, wherein the action of separating comprises an action of filtering the at least one windowed stream into the first and second sets of streams.

9. The method according to claim 8, wherein the action of filtering comprises an action of applying at least one pass-band that has as a first extremity thereof, a separation frequency that distinguishes vibrations corresponding to physical events of the vertebrate associated with cardiovascular activity from vibrations corresponding to physical events of the vertebrate associated with respiration.

10. The method according to claim 9, wherein the pass-band has as a second extremity thereof, a frequency that distinguishes vibrations corresponding to physical events of the vertebrate associated with at least one of cardiovascular activity and respiration from vibrations substantially unrelated thereto.

11. The method according to claim 8, wherein the action of filtering comprises an action of performing at least one of a z-transformation and a fast Fourier transformation (FFT).

12. The method according to claim 1, wherein the integer is 2.

13. The method according to claim 1, wherein the action of organizing limits application of the action of autocorrelating to a time-limited stream of samples.

14. The method according to claim 1, wherein the action of organizing is performed by a windowing subsystem.

15. The method according to claim 1, further comprising an action of conditioning at least one of the first set of streams and the second set of streams.

16. The method according to claim 15, wherein the action of conditioning at least one of the first set of streams and the second set of streams comprises projecting the at least one of the first set of streams and the second set of streams as a stream of magnitudes along a selected axis.

17. The method according to claim 16, wherein the selected axis is one of the axes of measurement.

18. The method according to claim 16, wherein the selected axis is a composite of the at least one axis of measurement.

19. The method according to claim 16, wherein the action of conditioning the first set of streams comprises smoothing the stream of magnitudes.

20. The method according to claim 15, wherein the action of conditioning the first set of streams comprises reducing the stream of magnitudes by a mean value of the magnitudes.

21. The method according to claim 20, wherein the action of conditioning the first set of streams comprises squaring the reduced stream of magnitudes.

22. The method according to claim 15, wherein the action of conditioning the second set of streams comprises an action of selecting a single frequency from the second set of streams from at least one of a maximum frequency, a minimum frequency, a mean frequency and an intermediate frequency.

23. The method according to claim 22, wherein the action of extracting at least one datum comprises using the determined characteristic frequency as a respiration rate (RR).

24. The method according to claim 22, wherein the action of conditioning the second set of streams comprises an action of isolating a single cycle of the selected frequency.

25. The method according to claim 24, wherein the action of conditioning the second set of streams comprises an action of fitting a sinusoidal function to the isolated single cycle of the selected frequency.

26. The method according to claim 25, wherein the action of extracting at least one datum comprises deriving a respiratory phase (RP) from a ratio of a positive half-cycle of the single cycle of the sinusoidal function relative to a negative half-cycle thereof.

27. The method according to claim 25, wherein the action of extracting at least one datum comprises deriving a respiratory volume (RV) from a difference between a maximum positive amplitude and a maximum negative amplitude of the single cycle of the sinusoidal function.

28. The method according to claim 27, wherein the at least one datum comprises a stream of instantaneous values thereof.

29. The method according to claim 1, wherein the action of extracting comprises deriving a heart rate (HR) from a time difference between consecutive peaks associated with AO.

30. The method according to claim 29, wherein the action of extracting comprises deriving a plurality of heart rates from consecutive peaks associated with opening of an aortic valve and deriving a heart rate variability (HRV) from a difference therein.

31. The method according to claim 1, wherein the action of determining comprises ignoring the identified peak associated with opening of the aortic valve and thereafter noting a maximum positive acceleration.

32. An instrument comprising:
a processor; and
a non-transitory memory for storing instructions that when executed by the processor cause the instrument to non-invasively derive at least one biometric datum, of a living vertebrate, by:
receiving, from a sensor positioned against the vertebrate that correspond to a seismocardiogram (SCG) signal, time-domain samples of measurements, by the sensor, of vibrations within a body of the vertebrate, in at least one time-stamped stream that corresponds to at least one associated axis of measurement of at least one of linear and rotational acceleration;
organizing the samples into a plurality of windowed streams, each windowed stream having an associated time period and comprising a stream of sample groups, each group having an associated monotonously changing time stamp index and comprising samples having a time stamp that precedes a time represented by the index;
separating the plurality of windowed streams into a first set of streams corresponding to physical events of the vertebrate associated with cardiovascular activity and a second set of streams corresponding to physical events of the vertebrate associated with respiration;
extracting the at least one datum from at least one of:
a selected one of the first set of streams whose associated time period is substantially an integer multiple of a period of a cardiac cycle of the vertebrate by autocorrelating the first set of streams with a time-delayed version thereof to identify at least one characteristic peak of a cardiac cycle, corresponding to a cardiac event within the cardiac cycle, of the vertebrate, and the second set of streams by determining a characteristic frequency of respiration of the vertebrate;

identifying consecutive peaks associated with opening of an aortic valve (AO) in successive cardiac cycles and calculating a maximum positive acceleration followed by a maximum negative acceleration; and determining a peak associated with closing of the aortic valve (AC) in a cardiac cycle for which a peak associated with opening thereof has been identified and deriving a left ventricle ejection time (LVET) from a time difference therebetween.

33. An instrument for non-invasively deriving at least one biometric datum, of a living vertebrate, comprising:

a sensor having at least three mutually orthogonal axes, that measure at least one of: linear, and rotational acceleration, for positioning against the vertebrate, and generating time-domain samples of measurements of vibrations within a body of the vertebrate that correspond to a seismocardiogram (SCG) signal, in at least one time-stamped stream that corresponds to at least one associated axis of measurement of at least one of: linear, and rotational, acceleration;

a processor; and a non-transitory memory for storing instructions that when executed by the processor, cause the instrument to non-invasively derive at least one biometric datum from the vertebrate, by:

receiving the samples from the sensor;

organizing the samples into a plurality of windowed streams, each windowed stream having an associated time period and comprising a stream of sample groups, each group having an associated monotonously changing time stamp index and comprising samples having a time stamp that precedes a time represented by the index;

separating the plurality of windowed streams into a first set of streams corresponding to physical events of the vertebrate associated with cardiovascular activity and a second set of streams corresponding to physical events of the vertebrate associated with respiration;

extracting the at least one datum from at least one of:

a selected one of the first set of streams whose associated time period is substantially an integer multiple of a period of a cardiac cycle of the vertebrate by autocorrelating the first set of streams with a time-delayed version thereof to identify at least one characteristic peak of a cardiac cycle, corresponding to a cardiac event within the cardiac cycle, of the vertebrate, and the second set of streams by determining a characteristic frequency of respiration of the vertebrate;

identifying consecutive peaks associated with opening of an aortic valve (AO) in successive cardiac cycles and calculating a maximum positive acceleration followed by a maximum negative acceleration; and determining a peak associated with closing of the aortic valve (AC) in a cardiac cycle for which a peak associated with opning thereof has been identified and deriving a left ventricle ejection time (LVET) from a time difference therebetween.

34. The instrument of claim 33, wherein the sensor is an accelerometer.

* * * * *